US009065696B2

(12) United States Patent
Asmanis et al.

(10) Patent No.: US 9,065,696 B2
(45) Date of Patent: Jun. 23, 2015

(54) ADAPTIVE EQUALIZER

(71) Applicant: Avago Technologies General IP (Singapore) Pte. Ltd., Singapore (SG)

(72) Inventors: Georgios Asmanis, Lake Forest, CA (US); Faouzi Chaahoub, San Jose, CA (US); Samir Aboulhouda, Cupertino, CA (US); Sriramkumar Sundararaman, Belmont, CA (US); Ajay Kumar Yadav, Belmont, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 40 days.

(21) Appl. No.: 13/969,534

(22) Filed: Aug. 17, 2013

(65) Prior Publication Data
US 2015/0049797 A1    Feb. 19, 2015

(51) Int. Cl.
H03H 7/30    (2006.01)
H03H 7/40    (2006.01)
H03K 5/159   (2006.01)
H04L 25/03   (2006.01)

(52) U.S. Cl.
CPC ............................... H04L 25/03006 (2013.01)

(58) Field of Classification Search
None
See application file for complete search history.

(56) References Cited

U.S. PATENT DOCUMENTS 6,381,085 B1 *   4/2002   Du et al. .................... 360/65
7,117,145 B1 *  10/2006   Venkatesh et al. .......... 704/200
2006/0203899 A1 *  9/2006   Gee .......................... 375/232

OTHER PUBLICATIONS

QT2025PxKD Data Sheet [online]. Applied Micro Circuits Corporation, 2009 [retrieved on Jul. 18, 2013]. Retrieved from the Internet: <URL: http://datasheet.octopart.com/QT2025PRKD-AMCC-datasheet-11776220.pdf>.
Lee, Wang Joo, et al., "40-Gb/s Adaptive Electronic Polarization-Mode Dispersion Compensator Using a Hybrid-MIC 3-Tap Linear Equalizer," Journal of the Korean Physical Society, vol. 51, No. 4, Oct. 2007, pp. 1303-1306. [retrieved on Jul. 18, 2013]. Retrieved from the Internet: <http://www.kps.or.kr/jkps/downloadPdf.asp?articleuid=%7B04C55EC4-BE3D-437E-BAB2-AB0F0D787C79%7D>.

* cited by examiner

Primary Examiner — Chieh M Fan
Assistant Examiner — Wednel Cadeau

(57) ABSTRACT

An equalizer that includes equalizer circuitry, a mean squared error (MSE) system, and adaptive control logic includes features that inhibit undesirable convergence to local minima.

20 Claims, 20 Drawing Sheets

ADAPTIVE EQUALIZER

BACKGROUND

An equalizer is an electronic device that attempts to reverse distortion incurred when a signal is transmitted through a channel. In digital communications, an equalizer promotes reduction of inter-symbol interference. Distortion occurs because a channel's frequency response is not perfectly linear. If an equalizer's transfer function is the inverse of the channel's transfer function within the frequency range of the transmitted information, the equalizer can provide a flat response. The transfer function of an equalizer is commonly defined by circuitry having a number of nodes or taps that correspond to coefficients of the transfer function. Each tap has one or more controls, such as gain and dither. Setting the gain, dither or other tap controls establishes the transfer function.

In some equalizers, the tap controls or settings are fixed or hard-wired into the circuitry. In other equalizers, a user can program these settings. In still other equalizers, known as adaptive equalizers, tap control signals are generated in response to inputs that can vary. For example, an adaptive equalizer can vary the tap control signals in response to mean squared error (MSE) in a feedback-based manner. MSE is a measure of the difference between the transmitted data and the equalizer output (i.e., the equalized signal). An adaptive equalizer attempts to determine the set or group of tap settings that results in the least MSE, i.e., minimization of the MSE. Some adaptive equalizers perform such a process during a training sequence in preparation for data transmission. Other adaptive equalizers perform such a process dynamically during the data transmission. The latter type of adaptive equalizer may perform an iterative process that converges to a solution that minimizes the MSE. Adaptive equalizer circuitry can include Decision Feedback Equalizer (DFE) circuitry, Feedforward Equalizer (FFE) circuitry, continuous-time linear equalizer (CTLE) circuitry, or a combination of one or more of these. A problem that sometimes occurs is that the solution converges to a local minimum MSE and is unable to find a more global or overall minimum that exists.

SUMMARY

Embodiments of the present invention relate to an equalizer that includes equalizer circuitry, a mean squared error (MSE) system, and adaptive control logic. The equalizer circuitry is configured to output an equalized signal in response to an input signal, a plurality of gain control signals, and a plurality of dither control signals. The equalizer circuitry has a plurality of taps. Each tap is controlled by a set of control signals comprising one of the plurality of gain control signals and one of the plurality of dither control signals. The MSE system is configured to provide an output MSE value in response to the equalized signal during each of a plurality of iterations or cycles.

The adaptive control logic is configured to adjust the plurality of gain control signals and the plurality of dither control signals in response to an MSE value. The adaptive control logic is also configured to select the plurality of taps in a predetermined sequence over the plurality of cycles. The adaptive control logic is further configured to determine whether the output MSE value is less than a best MSE value following adjustment of the set of control signals controlling a selected tap during one of the plurality of cycles. The adaptive control logic is still further configured to set the best MSE value to the output MSE value and to adjust a gain control signal controlling the selected tap during a cycle if it is determined that the output MSE value is less than the best MSE value. If the adaptive control logic determines that the output MSE value is less than the best MSE value following adjustment of the set of control signals controlling a selected tap, then before selecting the next tap during the next cycle the adaptive control logic adjusts the dither control signal to a different dither value and determines whether the output MSE value in response to the different dither value is less than the best MSE value.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
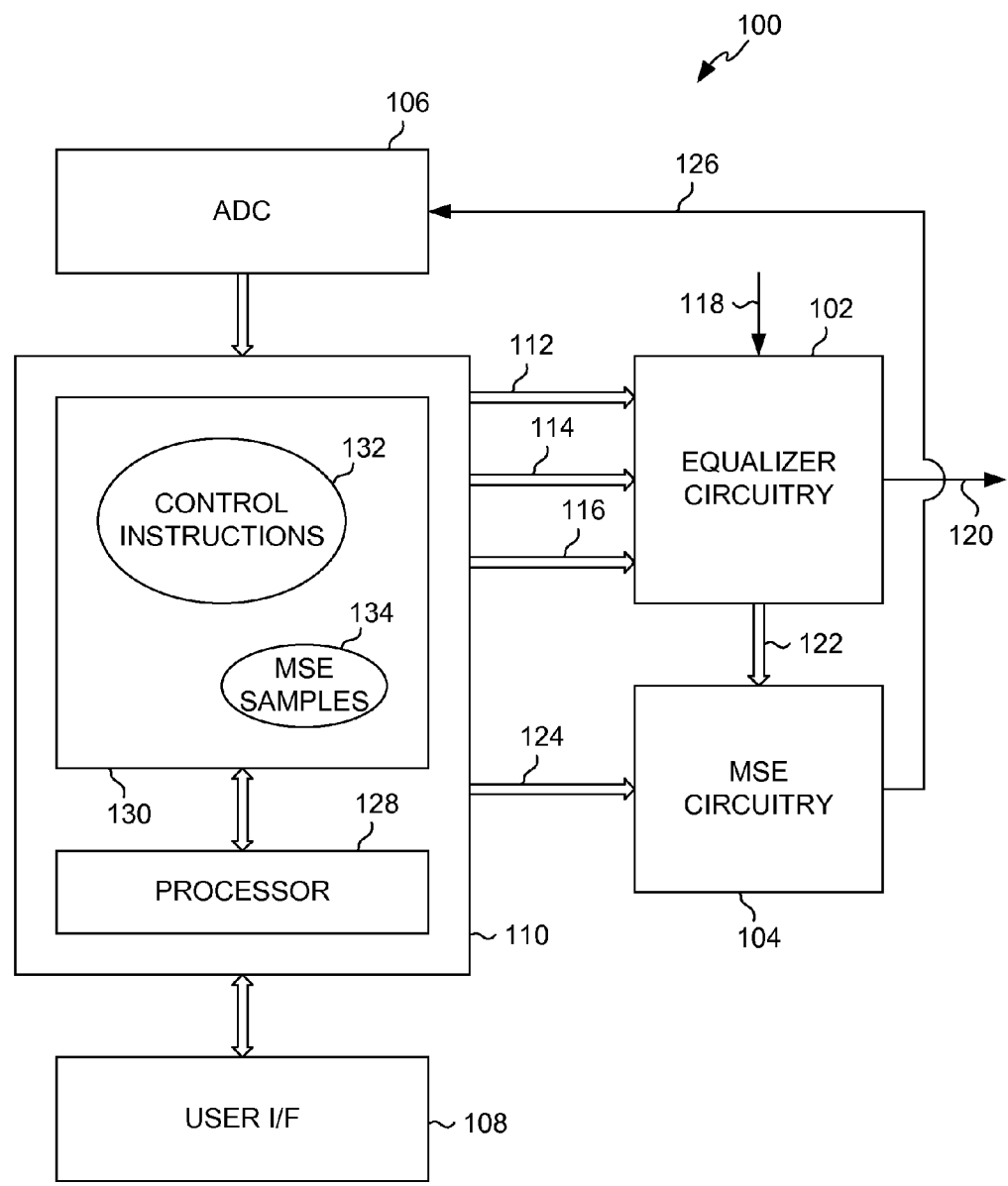
FIG. 1 is a block diagram of an adaptive equalizer, in accordance with an exemplary embodiment of the invention.

As illustrated in FIGS. 1-2, in an illustrative or exemplary embodiment of the invention, an adaptive equalizer 100 includes equalizer circuitry 102, mean squared error circuitry 104, analog-to-digital conversion circuitry 106, user interface circuitry 108, and adaptive control logic 110. Equalizer circuitry 102 can be of a type that is well known to persons skilled in the art and includes a combination of Decision Feedback Equalizer (DFE) aspects, Feedforward Equalizer (FFE) aspects, and continuous-time linear equalizer (CTLE) aspects. Equalizer circuitry 102 receives tap gain control signals 112, tap dither control signals 114, and CTLE control bus 116 from adaptive control logic 110. Equalizer circuitry 102 receives still other control signals from adaptive control logic 110, such as signals to enable or disable taps, but such other control signals are not shown for purposes of clarity. Equalizer circuitry 102 receives an input signal 118 to be equalized. In response to inputs that include tap gain control signals 112, tap dither control signals 114, and CTLE control bus 116, equalizer circuitry 102 applies equalization to input signal 118 to produce an equalized signal 120.

Figure 11:
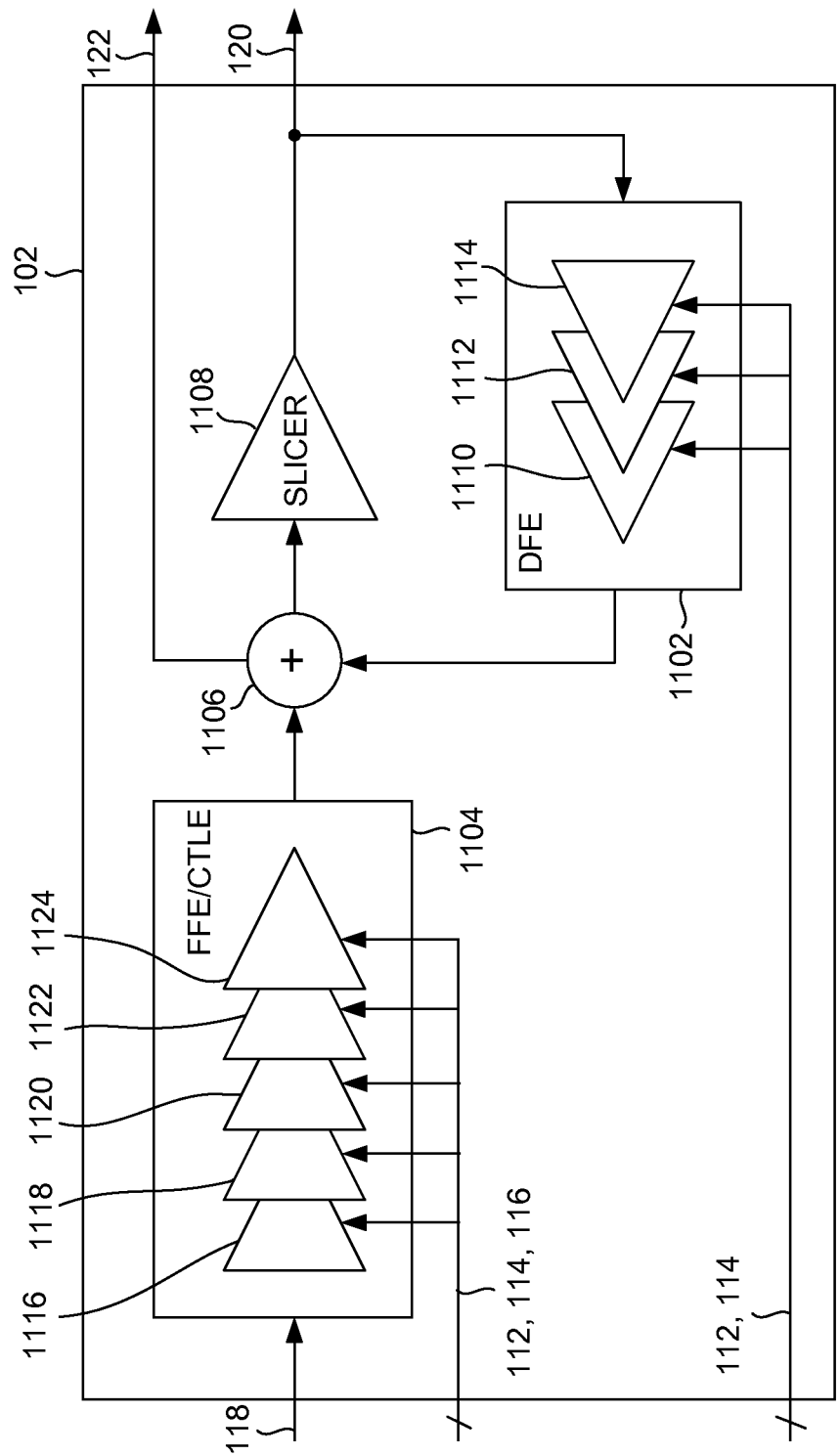
FIG. 11 is a block diagram of the equalizer circuitry of FIG. 1.

As illustrated in FIG. 11, suitable equalizer circuitry 102 can comprise DFE circuitry 1102, FFE/CTLE circuitry 1104, a summing node 1106, and a slicer 1108. The DFE circuitry 1102 comprises a plurality of taps 1110, 1112, 1114, etc., each controlled by one of tap gain control signals 112 and one of tap dither control signals 114. Similarly, FFE/CTLE circuitry 1104 comprises a plurality of taps 1116, 1118, 1120, 1122, 1124, etc., each controlled by one of tap gain control signals 112 and one of tap dither control signals 114. Thus, some of the taps of equalizer circuitry 102 control the DFE aspect or feature, while other taps of equalizer circuitry 102 control the FFE and CTLE aspect or feature. Input signal 118 is provided to inputs of both DFE circuitry 1102 and FFE/CTLE circuitry 1104. Summing node 1106 sums the outputs of DFE circuitry 1102 and FFE/CTLE circuitry 1104 and provides the result or sum to slicer 1108. The output of slicer 1108 defines the above-referenced equalized signal 120. High-speed equalized output signal 122 is the output of adder 1106 and is provided to the MSE block as shown in 100.

Figure 12:
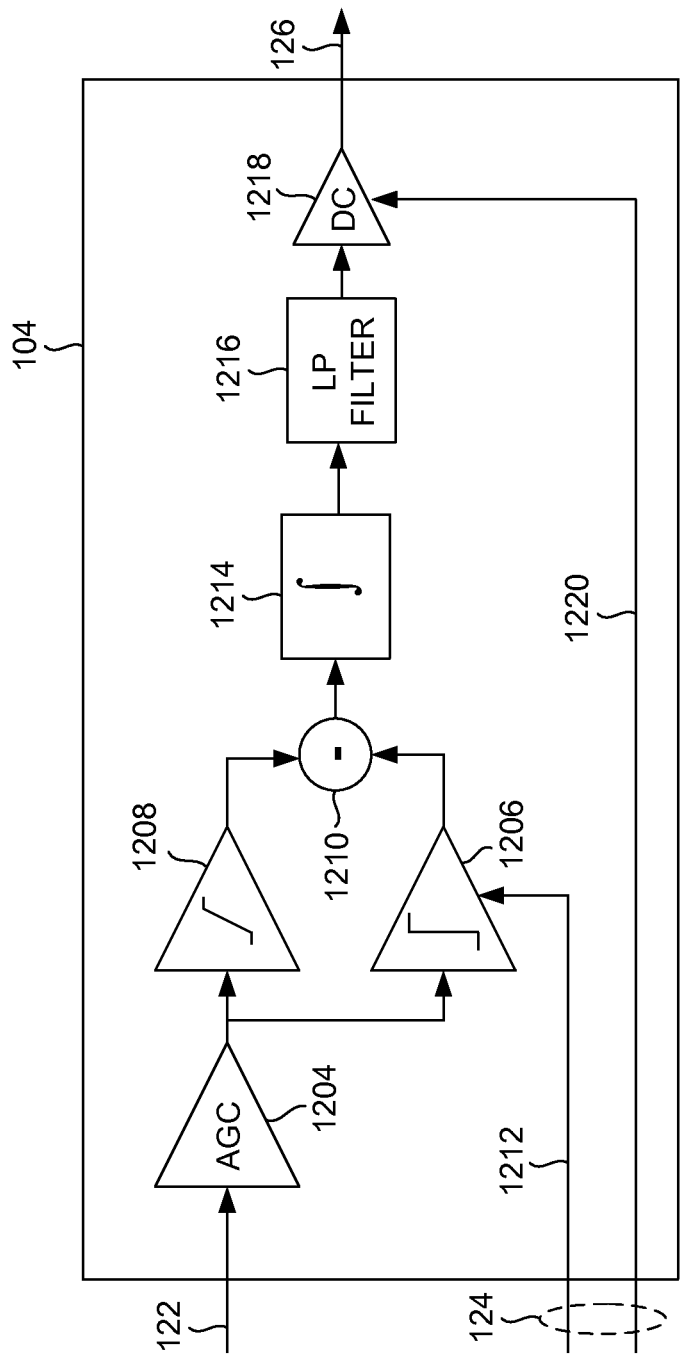
FIG. 12 is a block diagram of the MSE circuitry of FIG. 1.

Mean squared error (MSE) circuitry 104 receives the high-speed equalized output signal 122 from equalizer circuitry 102 and receives control signals 124 from adaptive control logic 110. As illustrated in FIG. 12, suitable MSE circuitry 104 includes automatic gain control (AGC) 1204, a limiter 1206, a linear unity gain stage 1208, and a high speed subtractor 1210. The AGC 1204 receives the high-speed equalized output signal 122. Control signals 124 include a swing control signal 1212 that controls limiter 1206. The output of AGC 1204 is provided to both limiter 1206 and linear unity gain stage 1208. Subtractor 1210 subtracts the output of limiter 1206 (i.e., a limited-path signal) from the output of linear unity gain stage 1208. The MSE circuitry 104 also includes an integrator 1214, a low-pass filter 1216, and a variable DC amplifier 1218. The integrator 1214 receives the output of subtractor 1210. Low-pass filter 1216 receives the output of integrator 1214. Variable DC amplifier 1218 receives the output of low-pass filter 1216. Control signals 124 include a DC gain control signal 1220 that controls the gain of variable DC amplifier 1218. The output of variable DC amplifier 1218 defines the above-referenced analog MSE output signal 126.

In response to signals 122 and 124, MSE circuitry 104 produces an MSE output signal 126 that represents an estimate of the mean squared error of the equalized signal 120. As persons of skill in the art are familiar with the structure and operation of equalizer circuitry 102, such aspects are not shown or described in further detail.

Analog to digital conversion (ADC) circuitry 106 converts the analog MSE output signal 126 into a digital signal and provides the digital signal to adaptive control logic 110. User interface circuitry 108 can include suitable digital bus control logic, such as, for example, I2C, as well as user interface devices such as a keyboard, display, etc. (not shown). User interface circuitry 108 allows a user to determine conditions in adaptive equalizer 100 and to set parameters and programmable values in adaptive equalizer 100.

Adaptive control logic 110 includes a processor 128 and memory 130. Other elements of adaptive control logic 110, such as configuration registers and interface logic, are not shown for purposes of clarity. Adaptive control logic 110 operates in response to software or instructions 132 that are executed by processor 128. Instructions 132 correspond to the methods described below. In view of the methods described below, persons skilled in the art are capable of providing suitable instructions 132 and programming or otherwise configuring adaptive control logic 110 to effect the methods. Although instructions 132 are conceptually shown as stored in or residing in memory 130 for purposes of illustration, persons skilled in the art understand that instructions 132 may not be stored or reside in their entirety within memory 130 but rather may be retrieved in portions on an as-needed basis from other sources (not shown) such as firmware or read-only memory for execution by processor 128 in accordance with conventional computing principles. In accordance with conventional computing principles, the execution of instructions 132 by processor 128 can be considered to give rise to logic that is configured to effect the methods described below. In this sense, adaptive control logic 110 comprises logic configured to effect the methods. It should also be noted that the combination of memory 130 and instructions 132 defines a "computer program product" as that term is understood in the patent lexicon. Although in the exemplary embodiment adaptive control logic 110 comprises processor 128 and memory 130, in other embodiments (not shown) such adaptive control logic can comprise any other suitable elements defined by any suitable combination of hardware, software, firmware, etc.

Also conceptually shown for purposes of illustration as stored or residing in memory 130 are MSE samples 134. MSE samples 134 represent a plurality of samples obtained from ADC circuitry 106. As described below in conjunction with a method of operation, adaptive control logic 110 computes an average of a plurality of MSE samples 134. The logic that computes this average, in combination with MSE circuitry 104, defines an MSE system configured to provide an output MSE value. It should be understood that instructions 132 and MSE samples 134 represent only examples of software and data that can be operated upon by processor 128, and still other software, firmware, data, etc., including, for example, intermediate results of computations, can be present but are not shown for purposes of clarity.

Figure 2A:
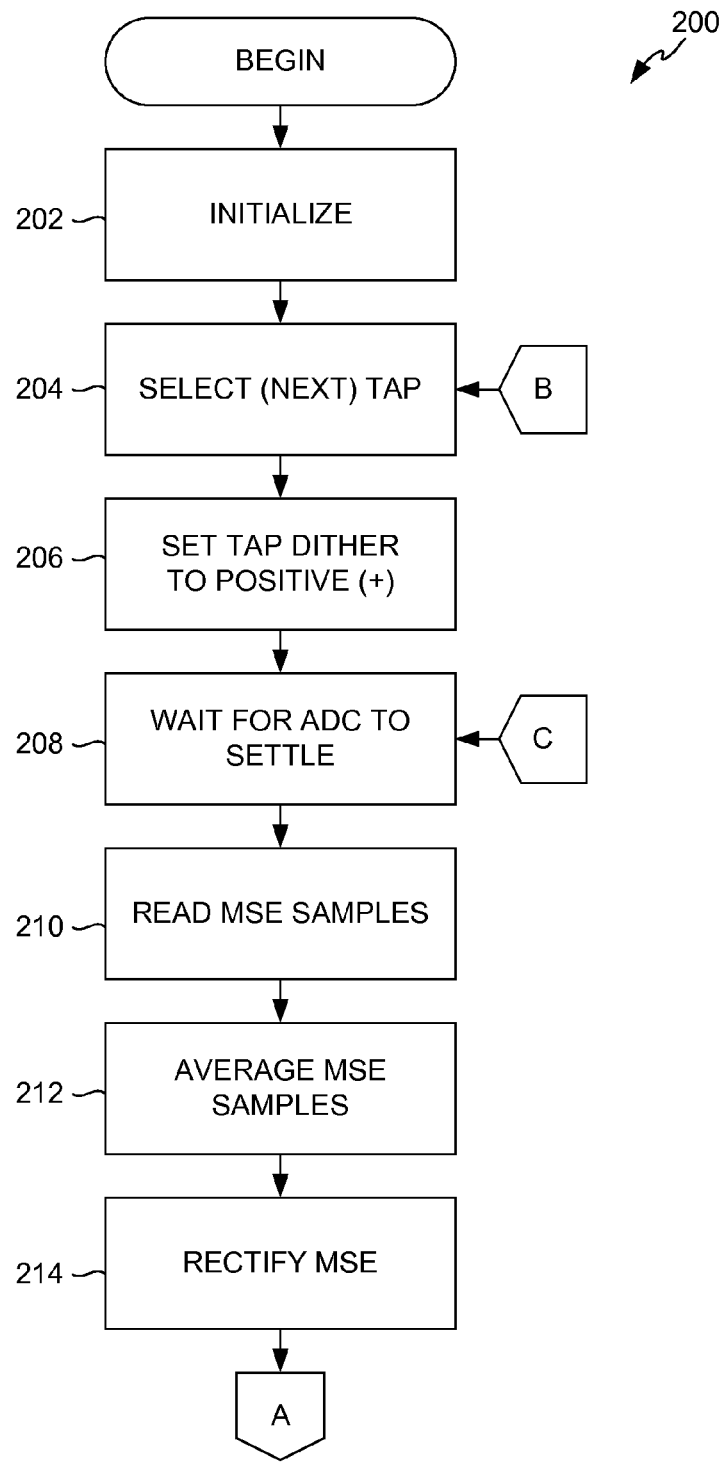
FIG. 2A is a flow diagram of a first exemplary method of operation of the adaptive equalizer of FIG. 1.
Figure 2B:
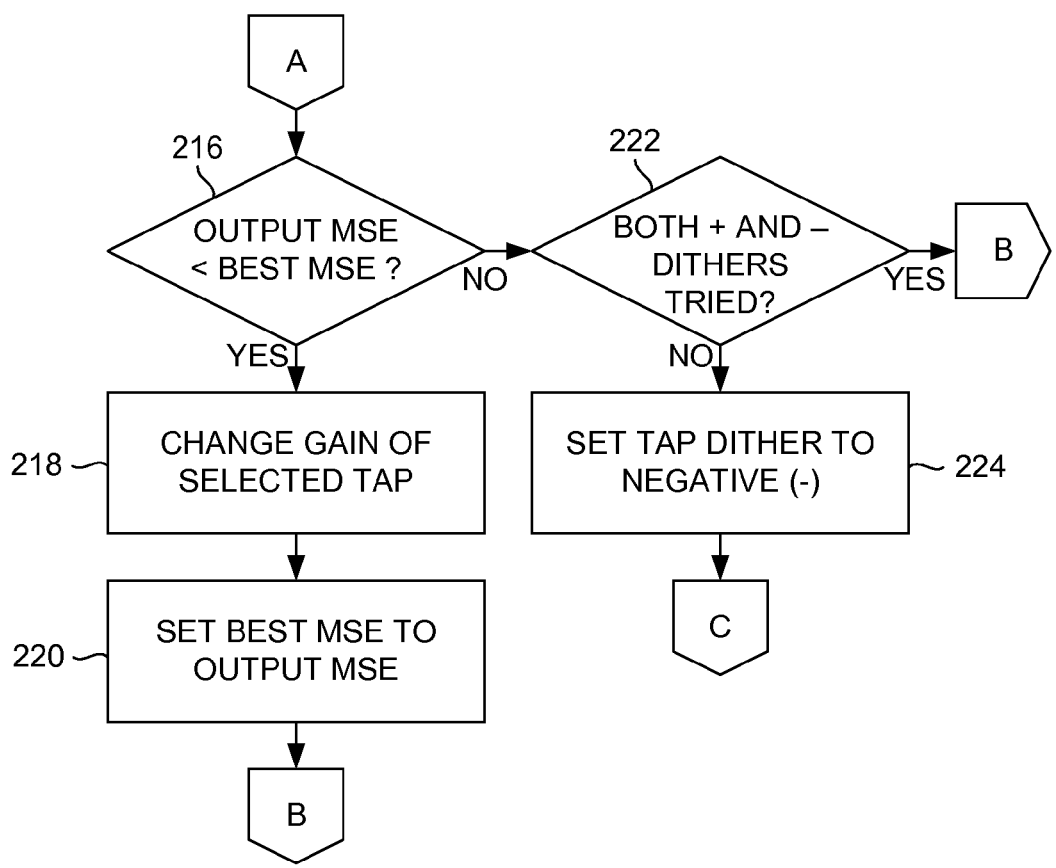
FIG. 2B is a continuation of the flow diagram of FIG. 2A.

As illustrated in FIGS. 2A-B, in an exemplary embodiment adaptive equalizer 100 (FIG. 1) can operate in accordance with an exemplary method of operation 200. Beginning as indicated by block 202, an initialization is performed in which adaptive control logic 110 sets parameters, including all tap gain control signals 112, to default values or are otherwise initialized in accordance with instructions 132.

As indicated by block 204, adaptive control logic 110 selects a tap to analyze and potentially adjust. Adaptive control logic 110 can select taps in a predetermined sequence that can be input (i.e., selected) by a user or determined in any other suitable manner. A default sequence can be, for example, each of the FFE taps followed by each of the DFE taps. Note that taps can be disabled or enabled by a user or in response to other criteria. For example, equalizer circuitry 102 can have five FFE taps and nine DFE taps, but during an exemplary instance in which adaptive equalizer 100 is operated, only a subset such as, for example, three of the five FFE taps and six of the nine DFE taps, is enabled. For purposes of clarity, the method is described herein without regard to taps that exist but are not enabled. Block 204 indicates that adaptive control logic 110 selects the next tap in the sequence. Thus, following initialization (block 202) the first tap in the sequence is selected. Note that method 200 is iterative and selects taps in a round-robin or circular manner in accordance with the sequence. That is, after the last tap in the sequence is selected (block 204) and the cycle in which the last tap is selected concludes, method 200 again selects the first tap (block 204) in the sequence upon beginning the next cycle.

As indicated by block 206, adaptive control logic 110 sets the one of dither control signals 114 corresponding to the selected tap. Each of dither control signals 114 can be set to a value that represents either positive (+) or negative (−) dither. For example, adaptive control logic 110 can initially set the one of dither control signals 114 corresponding to the selected tap to represent positive dither.

During operation of adaptive equalizer 100, equalizer circuitry 102 operates upon input signal 118, and MSE circuitry 104 produces the analog MSE output signal 126 in an essentially continuous manner. As indicated by block 208, adaptive control logic 110 waits an amount of time (i.e., a delay) sufficient for the output of ADC conversion circuitry 106 to settle as it converts the analog MSE output signal 126. This delay can be user-configurable. As indicated by block 210, adaptive control logic 110 then samples the digital output of ADC conversion circuitry 106. As indicated by blocks 210 and 212, adaptive control logic 110 obtains two more such samples and averages them to obtain an output MSE value. Although in the exemplary embodiment, the output MSE value represents an average of a plurality of MSE samples, in other embodiments (not shown) such an output MSE value can represent the mean squared error in any other suitable manner.

As indicated by block 214, adaptive control logic 110 rectifies the output MSE value to ensure that its sign is positive. That is, if the output MSE value is negative, adaptive control logic 110 makes the output MSE value positive. If the output MSE value is already positive, adaptive control logic 110 does not change its sign.

As indicated by block 216, adaptive control logic 110 determines whether the output MSE value is less than a known "best MSE value." The best MSE value represents the minimum MSE to which method 200 has thus far converged. During the above-referenced initialization (block 202), the best MSE value is set to the maximum possible value. As additional iterations or cycles of method 200 are performed, the best MSE value may or may not converge to a more optimal solution. That is, a still lower best MSE value may or may not be identified. A reduction in the best MSE over a cycle indicates that the adjustment to one of the tap gain control signals 112 or one of the tap dither control signals 114 that was made during that cycle resulted in improvement or further convergence.

If adaptive control logic 110 determines (block 216) that the output MSE value is less than the best MSE value, i.e., there has been improvement over the cycle, then adaptive control logic 110 changes the gain of the selected tap, as indicated by block 218. That is, adaptive control logic 110 adjusts the one of tap gain control signals 112 controlling the tap that has been selected (block 204) during the cycle. Adaptive control logic 110 can adjust the tap gain control signal 112 by, for example, one least-significant bit (LSB). If the one of dither control signals 114 applied during the cycle is positive, then adaptive control logic 110 can adjust the tap gain control signal 112 by incrementing it by one LSB. If the one of dither control signals 114 applied during the cycle is negative, then adaptive control logic 110 can adjust the tap gain control signal 112 by decrementing it by one LSB.

In addition, adaptive control logic 110 sets the best MSE value to the output MSE value, as indicated by block 220. Method 200 then continues as described above with regard to block 204. However, if adaptive control logic 110 determines (block 216) that the output MSE value is not less than the best MSE value, indicating no further convergence, then adaptive control logic 110 determines whether both positive and negative dithers have been applied to the selected tap, as indicated by block 222. If only a positive dither has been thus far applied during the cycle (block 206), then adaptive control logic 110 sets the dither control 114 corresponding to the selected tap to represent a negative dither, and method 200 continues as described above with regard to block 208 and repeats. One complete iteration of method 200, including applying positive dither (block 206) and, if no further convergence was detected (block 216) after application of only positive dither, applying negative dither (block 224), is referred to herein for purposes of convenience as a "cycle." Note that in accordance with method 200 each cycle involves selection (block 204) of one tap. Stated another way, another tap is optimized during each successive cycle. As described below, other methods may involve selection of fewer than one tap per cycle.

Figure 3A:
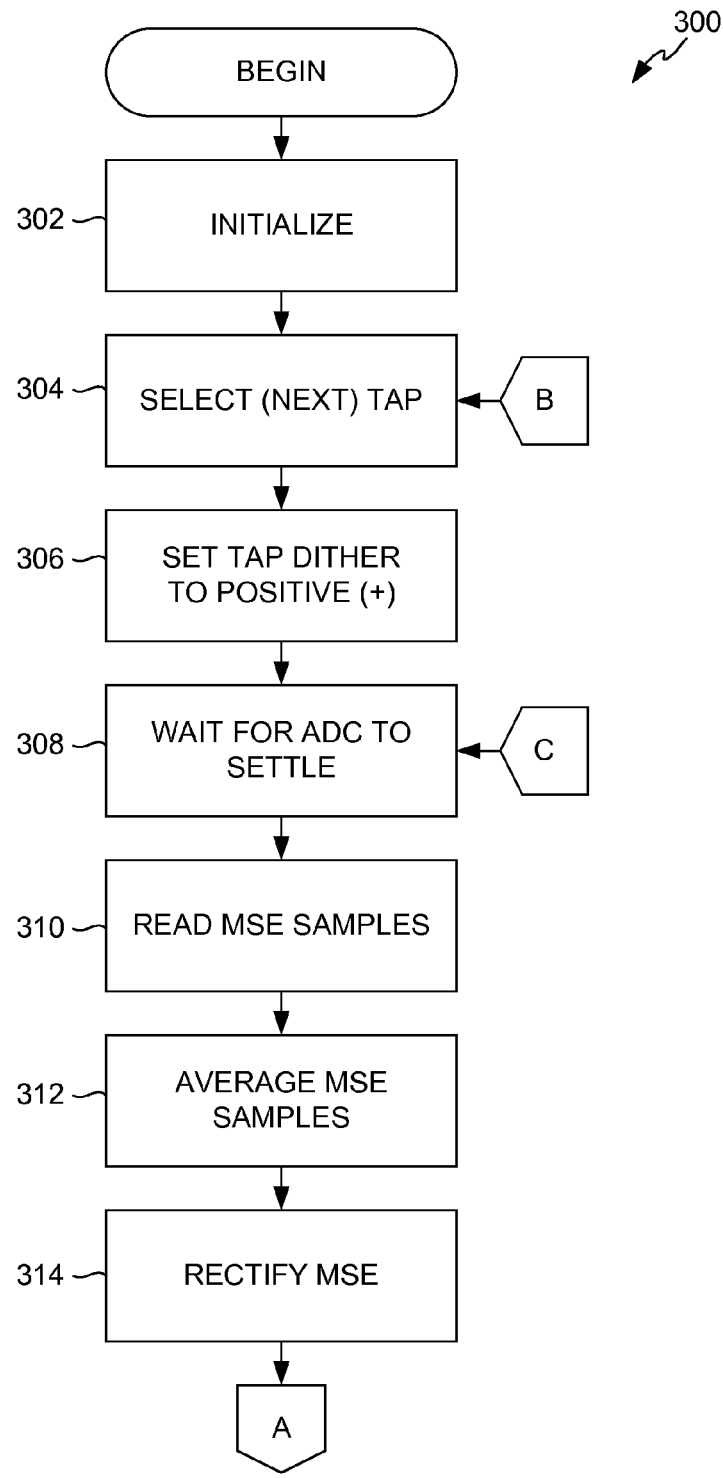
FIG. 3A is a flow diagram of a second exemplary method of operation of the adaptive equalizer of FIG. 1.
Figure 3B:
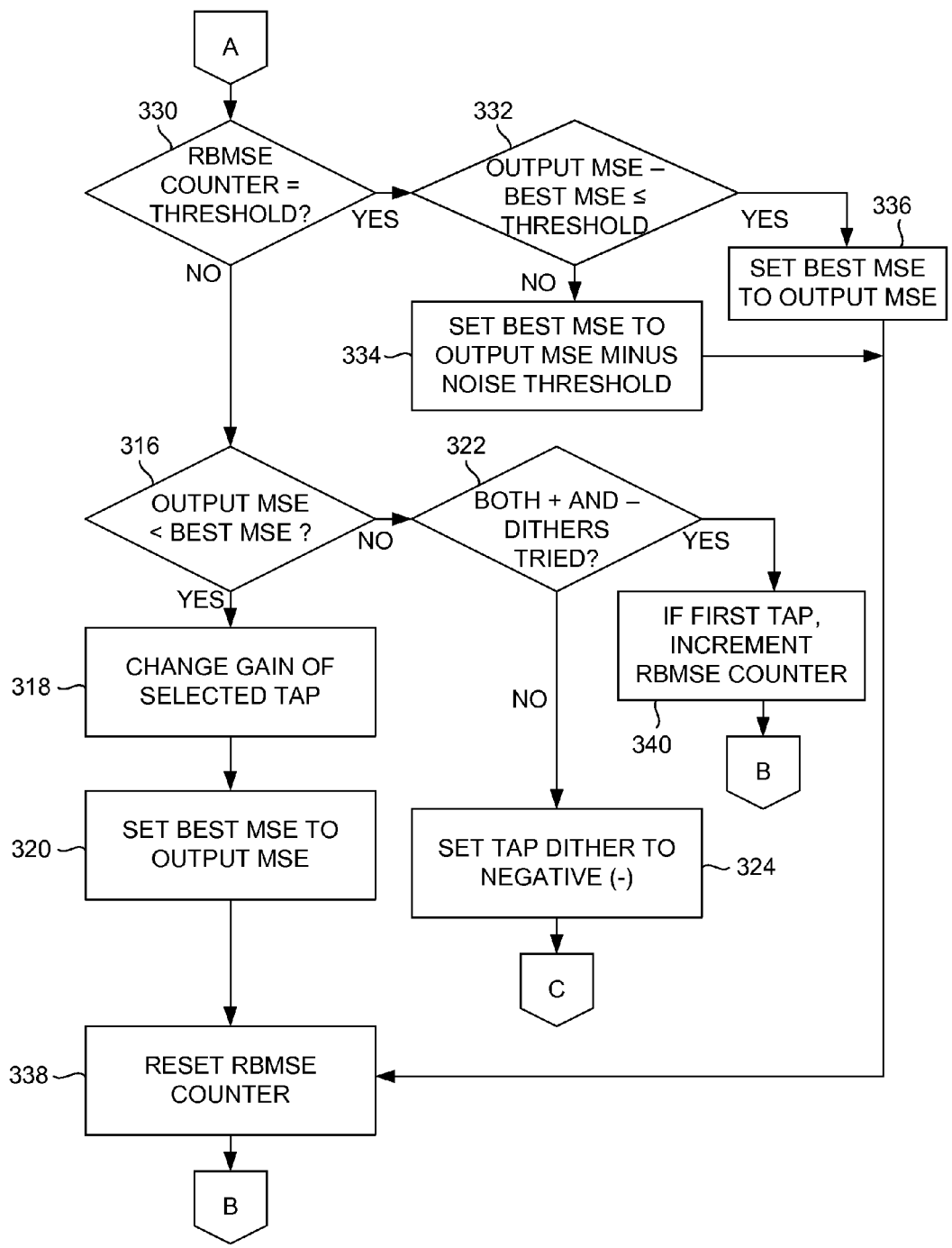
FIG. 3B is a continuation of the flow diagram of FIG. 3A.

As illustrated in FIGS. 3A-B, in another exemplary embodiment adaptive equalizer 100 (FIG. 1) can operate in accordance with an exemplary method of operation 300. Blocks 304, 306, 308, 310, 312 and 314 are the same as blocks 204, 206, 208, 210, 212 and 214, respectively, described above with regard to FIG. 2. Accordingly, for purposes of clarity they are not described again with regard to FIG. 3. Block 302 is the same as block 202 except that the initializations include initializing a Refresh best MSE (RBMSE) counter to zero.

Following adaptive control logic 110 rectifying the output MSE (block 314), adaptive control logic 110 determines whether the RBMSE counter has reached an RBMSE threshold count, as indicated by block 330. If adaptive control logic 110 determines that the RBMSE counter has not reached the RBMSE threshold count, then the method 300 continues as indicated by block 316. Blocks 316, 318, 320, 322 and 324 are the same as blocks 216, 218, 220, 222 and 224, respectively, described above with regard to FIG. 2. Accordingly, for purposes of clarity they are not described again with regard to FIG. 3.

If adaptive control logic 110 determines (block 330) that the RBMSE counter has reached the RBMSE threshold count, then adaptive control logic 110 determines whether the difference between the output MSE value and the best MSE value is less than a noise threshold, as indicated by block 332. That is, adaptive control logic 110 determines whether the output MSE value and the best MSE are substantially equal to each other (i.e., the difference is below the noise threshold). The noise threshold represents the limit of resolution of ADC circuitry 106. The noise threshold can be user-selectable, such that, for example, a user can mask the least-significant bits (LSBs) of a 10-bit ADC value. The ADC LSBs are sensitive to minor changes in analog MSE output signal 126, which may fluctuate constantly and may swing the output MSE away from a real value.

If adaptive control logic 110 determines (block 332) that the output MSE value and the best MSE are not substantially equal to each other (i.e., the difference is greater than the noise threshold), then adaptive control logic 110 sets the best MSE value to the MSE value minus the noise threshold, as indicated by block 334. However, if adaptive control logic 110 determines (block 332) that the output MSE value and the best MSE are substantially equal to each other (i.e., are within the noise threshold window of each other), then adaptive control logic 110 sets the best MSE value to the output MSE value, as indicated by block 336. After adaptive control logic 110 either sets the best MSE value to the MSE value minus the noise threshold (block 334) or sets the best MSE value to the output MSE value (block 336), adaptive control logic 110 resets the RBMSE counter, as indicated by block 338. Method 300 then continues as indicated by block 304. Note that when adaptive control logic 110 determines that both positive and negative dithers have been applied to the selected tap (block 322), adaptive control logic 110 increments the RBMSE counter if the selected tap is the first tap in the sequence, as indicated by block 340.

The goal of method 300 is to prevent convergence to a local minimum MSE from inhibiting convergence to a more global minimum MSE. After a number of cycles indicated by the RBMSE counter threshold, if the best MSE value has not further decreased by more than the noise threshold window amount, then it can be inferred that method 300 is "stuck" in a local minimum "best" MSE with the possibility that, if allowed to continue (i.e., if un-stuck), method 300 could converge to a still better "best" MSE value, i.e., a value that is yet lower than the best MSE value at the time the method 300 became stuck. Therefore, if this condition of method 300 being stuck in local minima is detected, method 300 replaces the best MSE with the output MSE value so as to un-stick method 300 and allow it to continue to attempt to converge further to a more global minimum MSE.

Figure 4A:
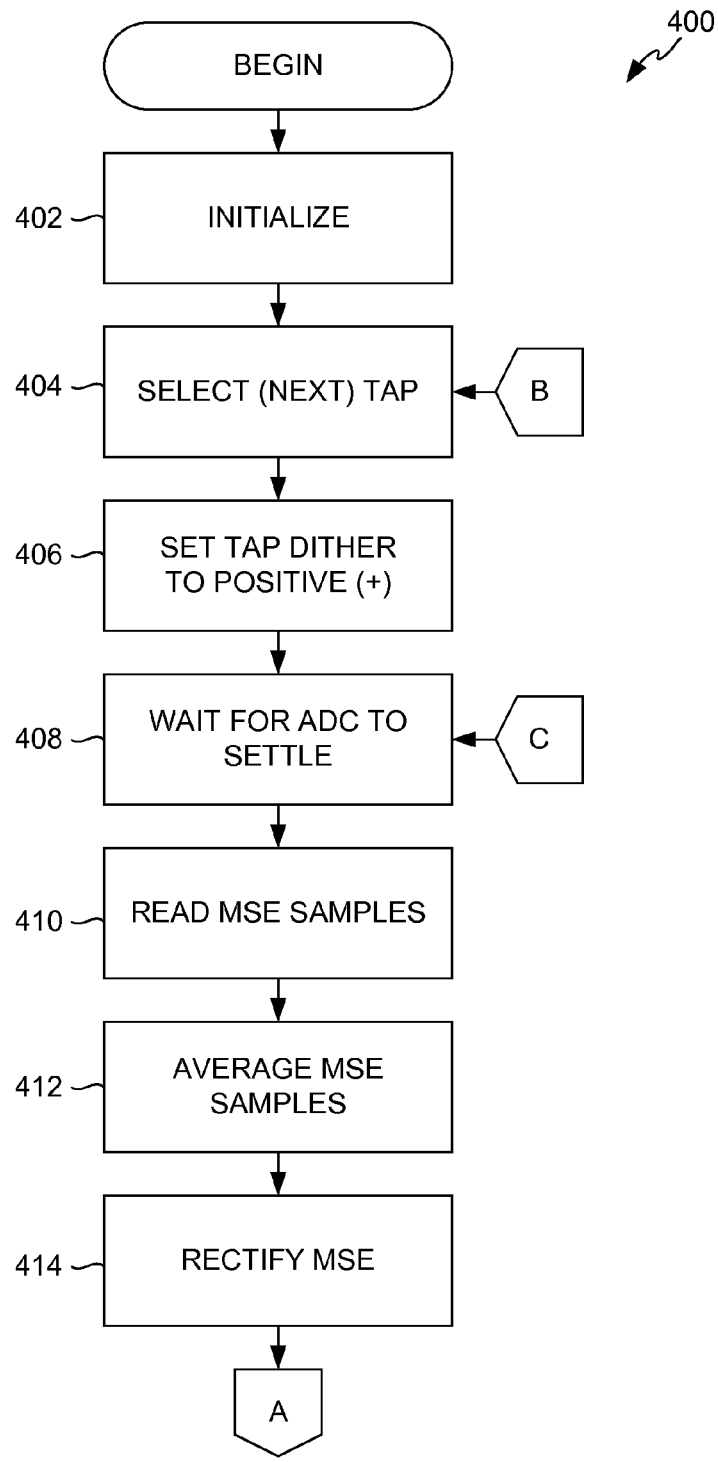
FIG. 4A is a flow diagram of a third exemplary method of operation of the adaptive equalizer of FIG. 1.
Figure 4B:
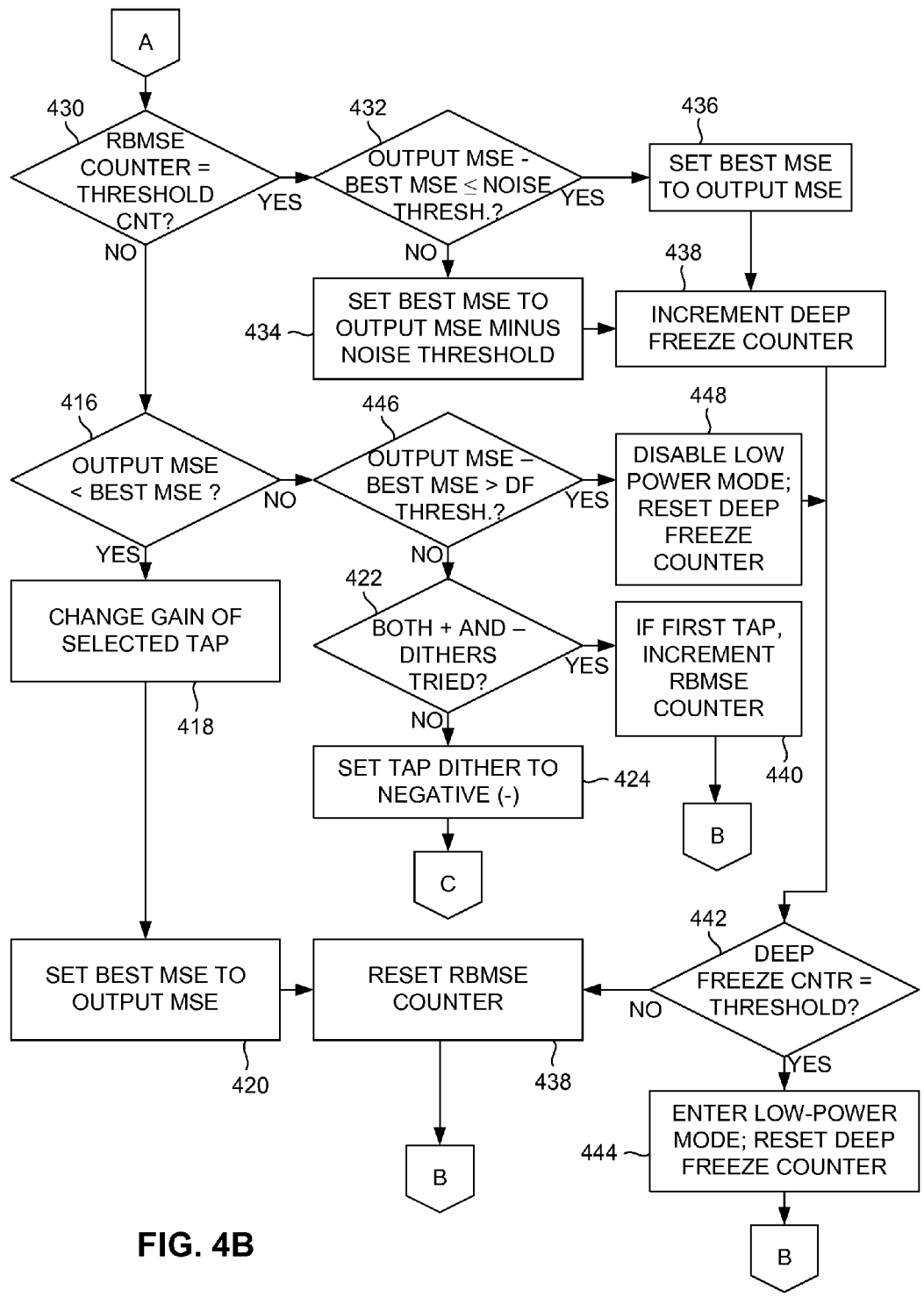
FIG. 4B is a continuation of the flow diagram of FIG. 4A.

As illustrated in FIGS. 4A-B, in another exemplary embodiment adaptive equalizer 100 (FIG. 1) can operate in accordance with another exemplary method of operation 400. Blocks 404, 406, 408, 410, 412, 414, 416, 418, 420, 422, 424, 430, 432, 434, 436 and 438 are the same as blocks 304, 306, 308, 310, 312, 314, 316, 318, 320, 322, 324, 336 and 338, respectively, described above with regard to FIG. 3. Accordingly, for purposes of clarity they are not described again with regard to FIG. 4. Block 402 is the same as block 302 except that the initializations include initializing a "deep freeze" counter to zero.

If adaptive control logic 110 determines (block 432) that the output MSE value and the best MSE are substantially equal to each other (i.e., their difference is below the noise threshold), then adaptive control logic 110 sets the best MSE to the output MSE as indicated by block 436 and increments a "deep freeze" counter, as indicated by block 438. Adaptive control logic 110 then determines whether the deep freeze counter has reached a deep freeze threshold count, as indicated by block 442. If adaptive control logic 110 determines that the deep freeze counter has reached the deep freeze threshold count, then adaptive control logic 110 causes adaptive equalizer 100 to enter a low-power mode, as indicated by block 444. The deep freeze counter is also reset, and method 400 continues as indicated by block 404. A low-power mode can be defined by, for example, a state in which the frequency of the clock signal (not shown) applied to ADC circuitry 106 (FIG. 1) is lowered, or in which DFE taps of equalizer circuitry 102 are disabled, or a combination of such power-conserving measures. However, if adaptive control logic 110 determines (block 442) that the deep freeze counter has not reached the deep freeze threshold count, then the method continues as indicated by block 438.

Method 400 includes returning adaptive equalizer 100 from the low-power or deep freeze state to a normal operational mode. If adaptive control logic 110 determines that the output MSE is not less than the best MSE (block 416), then adaptive control logic 110 determines whether the difference between the output MSE and the best MSE is greater than a deep freeze threshold level, as indicated by block 446. If adaptive control logic 110 determines that the difference between the output MSE and the best MSE is greater than this deep freeze threshold level, then adaptive control logic 110 returns adaptive equalizer 100 from the low-power or deep freeze state to a normal operational mode, as indicated by block 448. Adaptive control logic 110 also resets the deep freeze counter, and the method continues as indicated by block 442. If adaptive control logic 110 determines (block 446) that the difference between the output MSE and the best MSE is not greater than the deep freeze threshold level, then method 400 continues as indicated by block 422. Adaptive control logic 110 can return adaptive equalizer 100 from the low-power or deep freeze state to a normal operational mode by, for example, increasing the frequency of the clock signal applied to ADC circuitry 106 or enabling DFE taps of equalizer circuitry 102 that had been disabled.

It can be noted that the above-described deep freeze mode of operation is an extension of the refresh BMSE mode of operation described above with regard to FIG. 3A-B. The RBMSE counter reaching its RBMSE threshold count during each of a number of successive cycles (the number indicated by the deep freeze threshold count) indicates that the method 400 has converged to a "true" best MSE that is unlikely to further decrease during further cycles. Therefore, if this condition of the method 400 having reached a true best MSE is detected, the method 400 can conserve power in adaptive equalizer 100 during such further cycles.

Figure 5A:
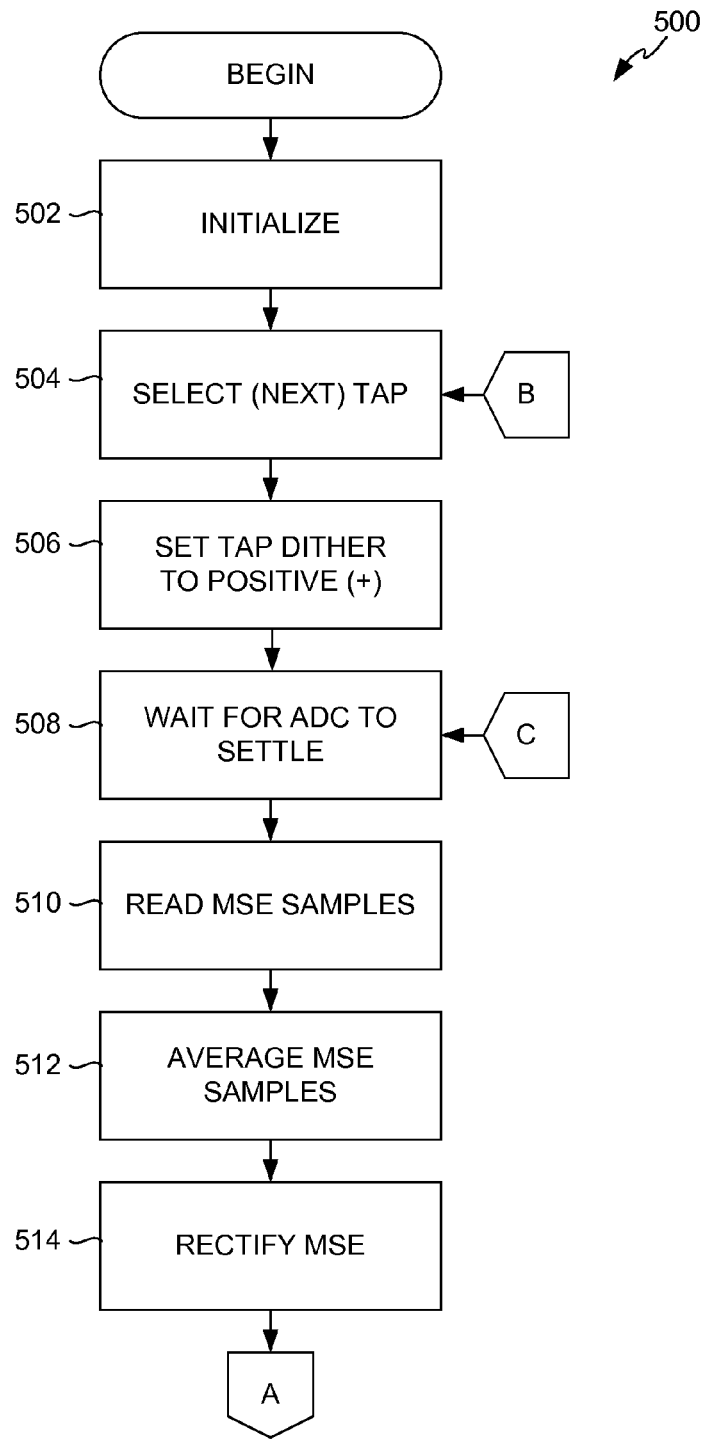
FIG. 5A is a flow diagram of a fourth exemplary method of operation of the adaptive equalizer of FIG. 1.
Figure 5B:
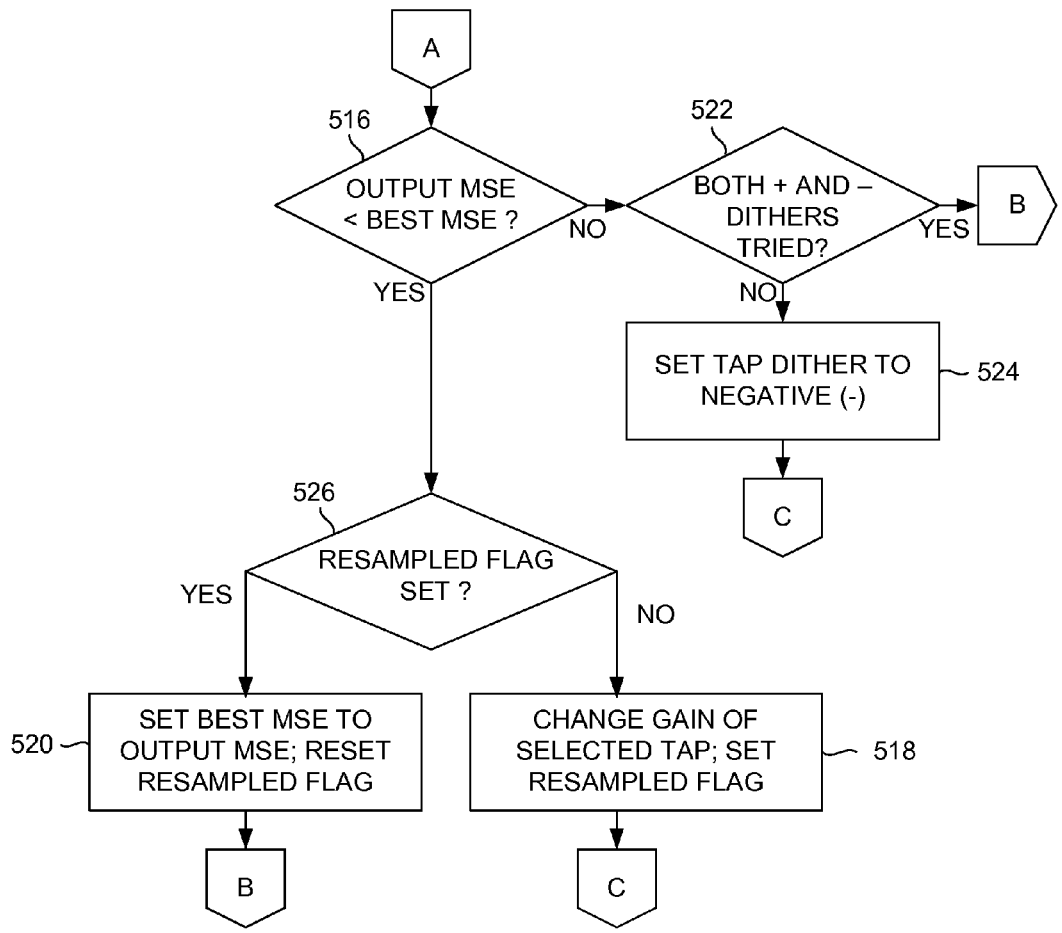
FIG. 5B is a continuation of the flow diagram of FIG. 5A.

As illustrated in FIGS. 5A-B, in another exemplary embodiment adaptive equalizer 100 (FIG. 1) can operate in accordance with an exemplary method of operation 500. Blocks 502, 504, 506, 508, 510, 512, 514, 516, 522 and 524 are the same as blocks 202, 204, 206, 208, 210, 212, 214, 216, 222 and 224 respectively, described above with regard to FIG. 2. Accordingly, for purposes of clarity they are not described again with regard to FIG. 5. Block 520 is similar to above-described block 220 but further includes resetting a "resampled" flag to indicate that the MSE has been resampled once. Block 518 is similar to above-described block 218 but further includes setting this flag to indicate that the MSE is being resampled.

The goal of method 500 is to validate that adjusting one of dither control signals 114 in a manner that resulted in a decrease in the best MSE value warrants adjusting the corresponding one of gain control signals 112. Thus, in method 500 a further cycle occurs in which the gain of the selected tap is adjusted without adjusting the dither of the selected tap, and the effect on the output MSE is determined. Thus, if adaptive control logic 110 determines (block 516) that the output MSE is less than the best MSE, then adaptive control logic 110 determines whether the resampled flag has been set, as indicated by block 526. If adaptive control logic 110 determines that the resampled flag has not been set, then adaptive control logic 110 adjusts the gain of the selected tap and sets the resampled flag, as indicated by block 518. Method 500 then continues as indicated by block 508, i.e., the next tap is not selected but rather the effect of adjusting the gain of the then-selected tap on the output MSE is determined (block 516). If adaptive control logic 110 determines (block 526) that the resampled flag has been set, then adaptive control logic 110 sets the best MSE to the output MSE and resets the resampled flag. Method 500 then continues as indicated by block 504, i.e., the next tap is selected.

Stated another way, if adaptive control logic 100 determines (block 516) that the output MSE value is less than the best MSE value following adjustment of the set of control signals controlling the selected tap, then before selecting the next tap and before adjusting the dither control signal again, adaptive control logic 110 adjusts (block 518) the gain control signal controlling the selected tap to a different gain value and again determines (block 516) whether the output MSE value in response to the different gain value is less than the best MSE value. In other words, the output MSE is "resampled" to confirm or validate that the result of adjusting the dither control signal warrants adjusting the corresponding gain control signal.

Figure 6A:
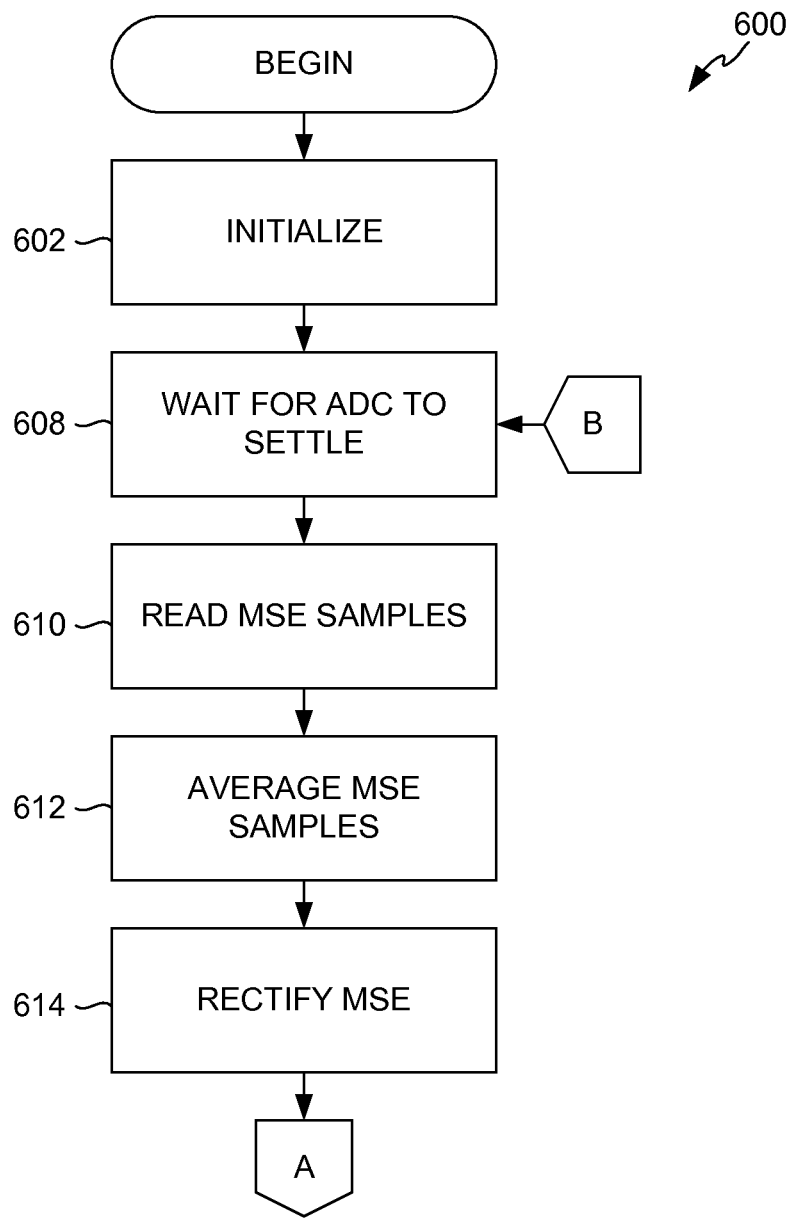
FIG. 6A is a flow diagram of a fifth exemplary method of operation of the adaptive equalizer of FIG. 1.
Figure 6B:
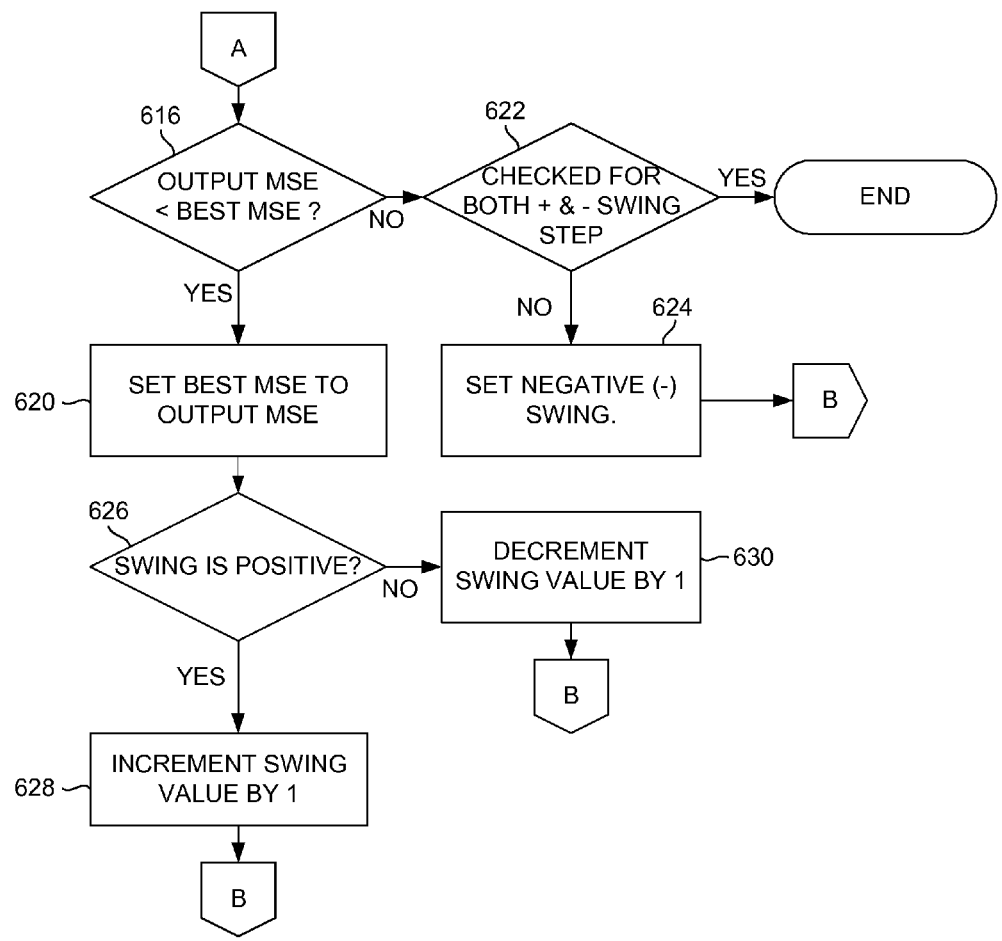
FIG. 6B is a continuation of the flow diagram of FIG. 6A.

As illustrated in FIGS. 6A-B, in another exemplary embodiment adaptive equalizer 100 (FIG. 1) can operate in accordance with an exemplary method of operation 600. Blocks 602, 608, 610, 612, 614, 616 and 620 are the same as blocks 202, 208, 210, 212, 214, 216 and 220, respectively, described above with regard to FIG. 2. Accordingly, for purposes of clarity they are not described again with regard to FIG. 6. Blocks 622 and 624 are similar to above-described blocks 222 and 224, respectively, expect that blocks 622 and 624 relate to swing polarity whereas blocks 222 and 224 relate to dither sign. Method 600 is a calibration method for calibrating the limiting path signal swing to an optimal value so that the amplitude difference of the limiting-path signal and linear-path signals in above-described MSE circuitry 104 is a minimum or zero, and analog MSE signal 126 is a function of error due to inter-symbol interference only and not a function of the amplitude difference. To achieve this across a wide range of equalization, the above-described AGC 1204 (FIG. 12) is included at the front end of the MSE circuitry 104. This ensures that the linear signal seen by the above-described subtractor 1210 does not change in amplitude as the equalization amount changes. As described below in further detail, in accordance with method 600, adaptive control logic 110 iteratively adjusts the value of the swing signal provided to MSE circuitry 104 and determines whether the adjustment resulted in an improvement, i.e., a decrease, in the amplitude difference between the limiting path signal (output of limiter 1206) and the linear path signal (output of linear unity gain stage 1208). The swing signal can be calibrated in accordance with method 600 before adjusting the tap gain and dither signals in accordance with, for example, one or more of the above-described methods 200-500.

The initializations indicated by block 602 can include initializing the swing signal to an initial value. If adaptive control logic 110 determines (block 616) that the output MSE value is not less than the best MSE value and determines (block 622) that both positive and negative dithers have been tried, then adaptive control logic 110 ends the swing calibration method 600. One or more of methods 200-500, for example, can then begin. If adaptive control logic 110 determines (block 616) that the output MSE value is less than the best MSE value and accordingly sets (block 620) the best MSE value to the output MSE value, then adaptive control logic 110 further determines whether the swing signal value is positive or negative, as indicated by block 626. If adaptive control logic 110 determines (block 626) that the swing value is positive, then adaptive control logic 110 increments the swing value by one, as indicated by block 628. If adaptive control logic 110 determines (block 626) that the swing value is negative, then adaptive control logic 110 decrements the swing value by one, as indicated by block 630. Regardless of whether the swing value is incremented or decremented, the method then continues as indicated by block 608. Thus, on each cycle in which it is determined that adjusting the swing value resulted in an improvement (i.e., reduction) in best MSE, then the swing value is further adjusted in the direction of the swing value sign (i.e., positive or negative), until it is determined that there has been no further improvement in best MSE.

Figure 7A:
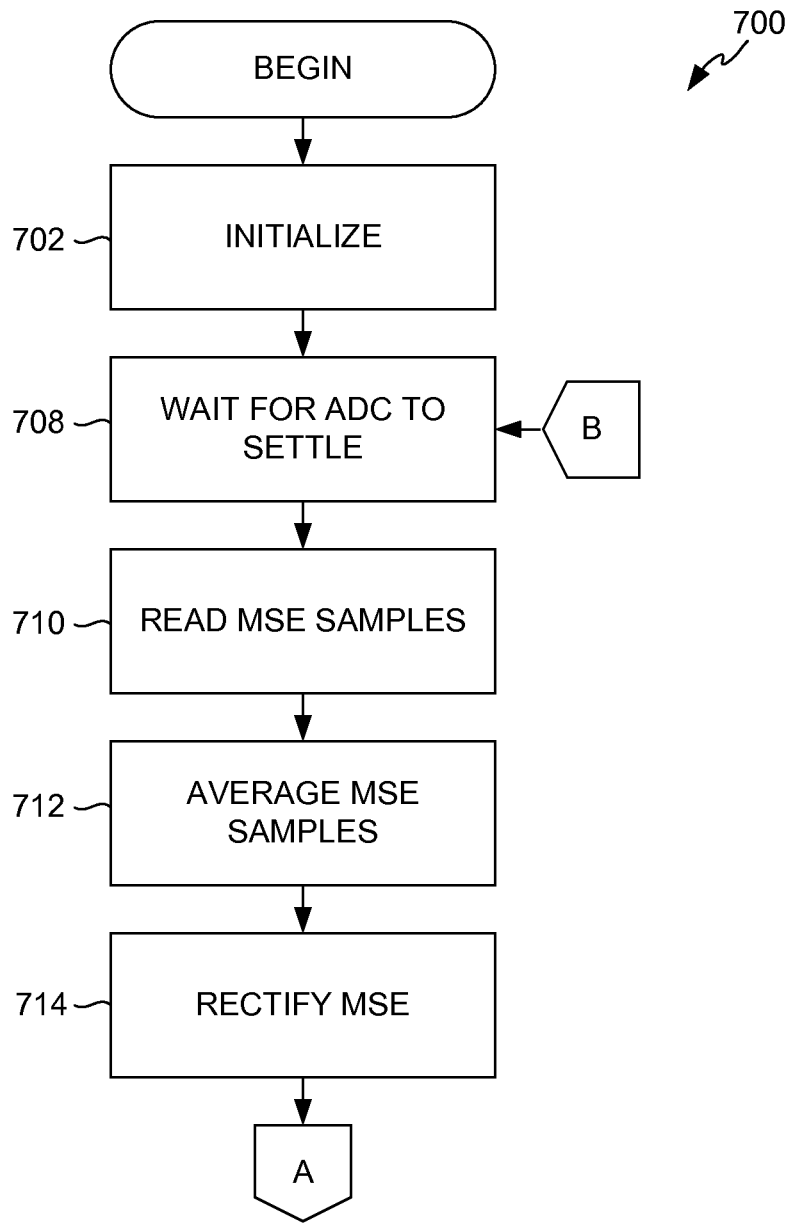
FIG. 7A is a flow diagram of a sixth exemplary method of operation of the adaptive equalizer of FIG. 1.
Figure 7B:
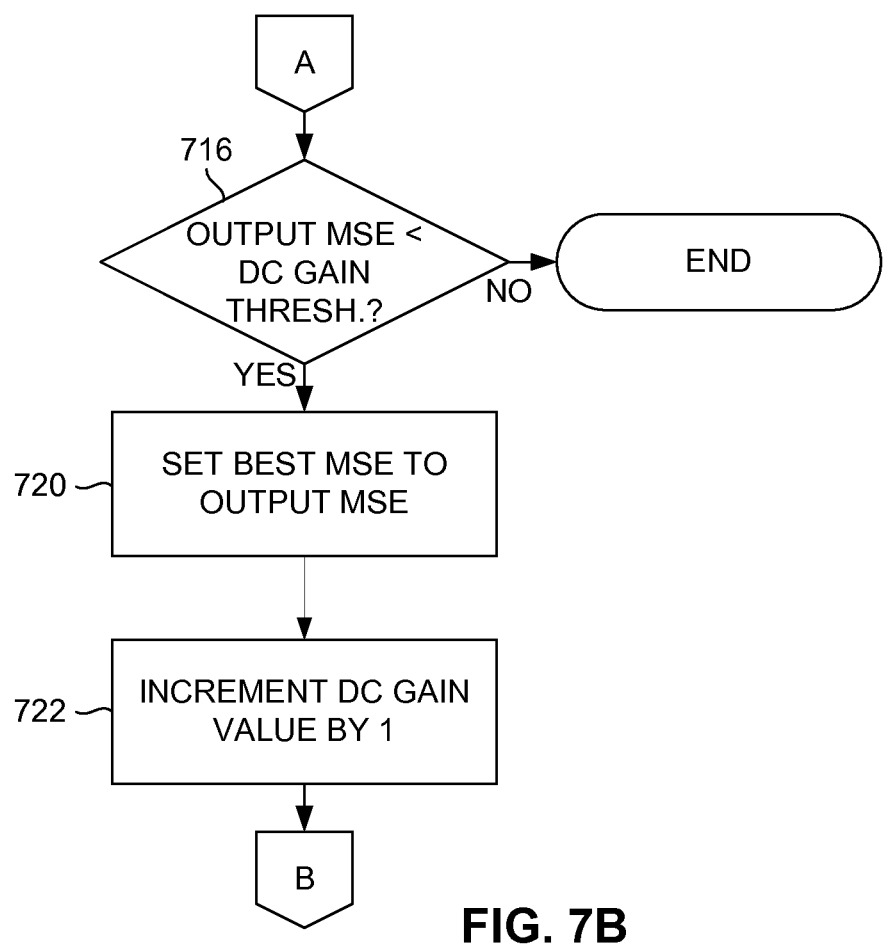
FIG. 7B is a continuation of the flow diagram of FIG. 7A.

As illustrated in FIGS. 7A-B, in another exemplary embodiment adaptive equalizer 100 (FIG. 1) can operate in accordance with an exemplary method of operation 700. Blocks 702, 708, 710, 712, 714 and 720 are the same as blocks 602, 608, 610, 612, 614 and 620, respectively, described above with regard to FIG. 6. Accordingly, for purposes of clarity they are not described again with regard to FIG. 7. Block 716 is similar to block 616 except block 716 indicates comparing (a predetermined or preselected group of MSBs only) of the output MSE with a programmable DC gain threshold, whereas block 616 indicates comparing the output MSE with the best MSE. Method 700 is a calibration method for calibrating a "DC gain" signal, which optimizes the amplitude of analog MSE output signal 126 so as to utilize the entire output range (e.g., 10 bits) of ADC circuitry 106. As described below in further detail, in accordance with method 700, adaptive control logic 110 iteratively adjusts the above-described DC gain control signal 1220 provided to MSE system 104 and determines whether adjusting the DC gain control signal 1220 results in an increase in the output MSE value over the output MSE value on the previous iteration. The DC gain signal can be calibrated in accordance with method 700 before adjusting the tap gain and dither signals in accordance with, for example, one or more of the above-described methods 200-500.

The initializations indicated by block 702 can include initializing the DC gain signal to an initial value, such as zero. If adaptive control logic 110 determines (block 716) that the value of selected output MSE bits is not less than the programmable DC gain threshold, then adaptive control logic 110 ends the DC gain calibration method 700. One or more of methods 200-500, for example, can then begin. If adaptive control logic 110 determines (block 716) that the selected MSBs of the output MSE value is less than the programmable DC gain threshold, then adaptive control logic 110 sets (block 720) the best MSE value to the output MSE value and increments the DC gain value by one, as indicated by block 722. Thus, on each cycle in which it is determined that adjusting the DC gain value resulted in an improvement (i.e., increase) in output MSE, then the DC gain value is further adjusted (e.g., incremented) until it is determined that the output MSE value has become bigger than the DC gain threshold.

Figure 8A:
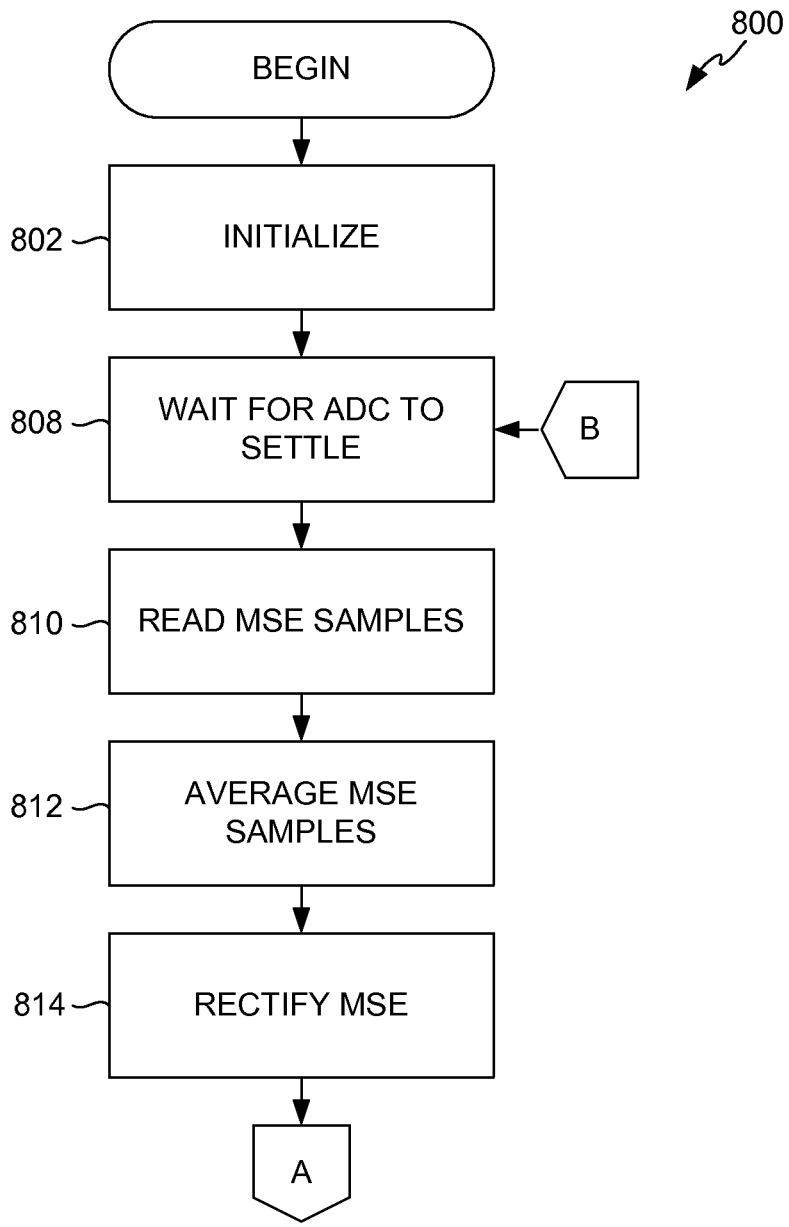
FIG. 8A is a flow diagram of a seventh exemplary method of operation of the adaptive equalizer of FIG. 1.
Figure 8B:
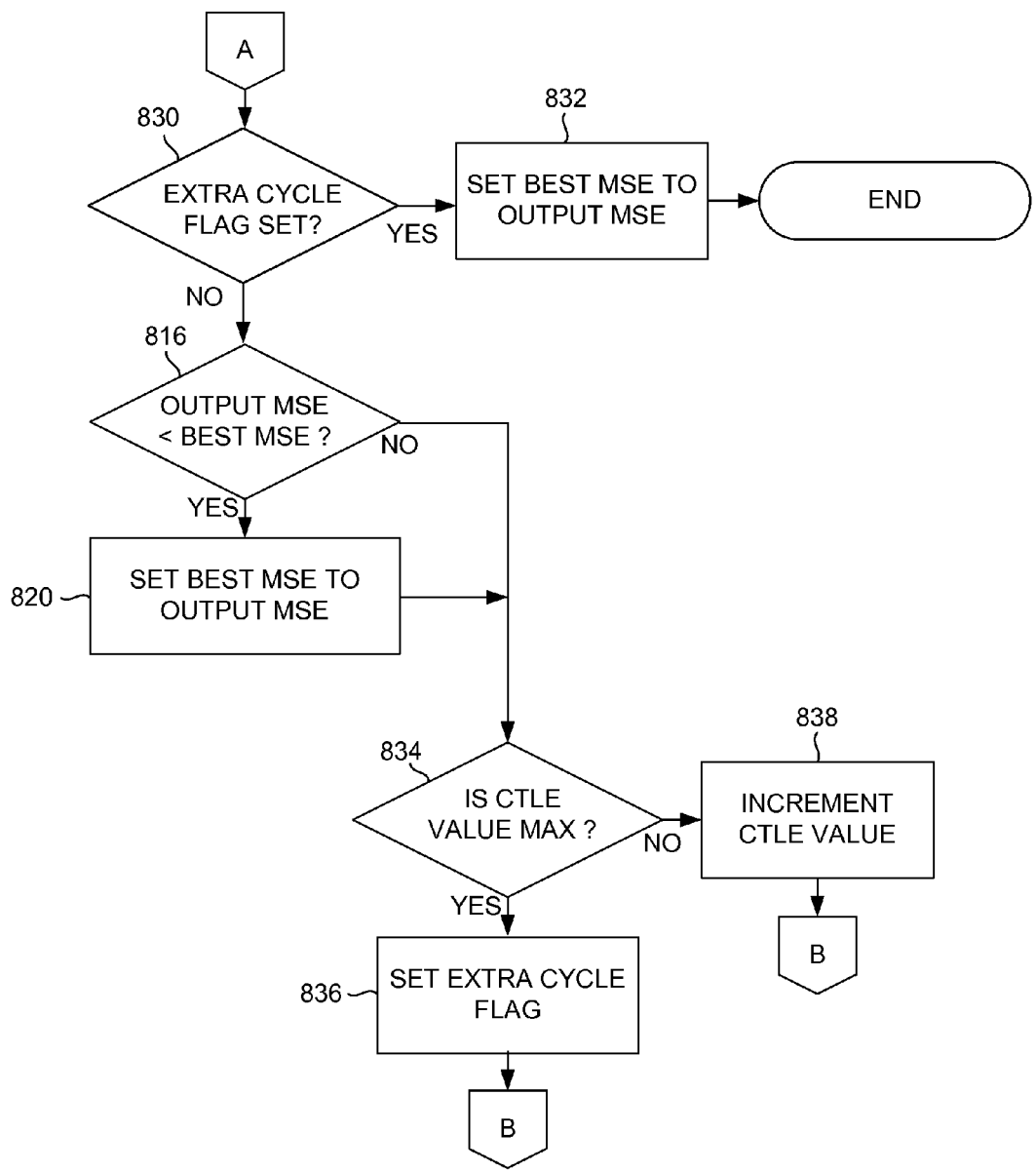
FIG. 8B is a continuation of the flow diagram of FIG. 8A.

As illustrated in FIGS. 8A-B, in another exemplary embodiment adaptive equalizer 100 (FIG. 1) can operate in accordance with an exemplary method of operation 800. Blocks 802, 808, 810, 812, 814, 816 and 820 are the same as blocks 602, 608, 610, 612, 614, 616 and 620, respectively, described above with regard to FIG. 6. Accordingly, for purposes of clarity they are not described again with regard to FIG. 8. Method 800 is a calibration method for finding an optimum value of CTLE that corresponds to a minimum MSE.

The initializations indicated by block 802 can include initializing the value communicated via CTLE control bus 116 to an initial value, such as zero. Method 800 is similar to above-described method 700 but method 800 includes an extra iteration or cycle so that the best MSE can be set to the output MSE resulting from having set the calibrated CTLE control bus value (i.e., the optimal value). Following block 814, adaptive control logic 110 determines if the extra cycle has been reached, as indicated by block 830. An extra cycle flag can be used to indicate that the extra cycle has been reached. If adaptive control logic 110 determines (block 830) that the extra cycle has been reached, then adaptive control logic 110 sets the best MSE value to the output MSE value, as indicated by block 832, and ends method 800. One or more of methods 200-500, for example, can then begin.

If adaptive control logic 110 determines (block 830) that the extra cycle has not been reached, then adaptive control logic 110 determines (block 816) whether the output MSE value is less than the best MSE value. If adaptive control logic 110 determines (block 816) that the output MSE value is not less than the best MSE value, then method 800 continues at block 834. If adaptive control logic 110 determines (block 816) that the output MSE value is less than the best MSE value, then adaptive control logic 110 sets the best MSE value to the output MSE value, as indicated by block 820, and method 800 continues at block 834. As indicated by block 834, adaptive control logic 110 determines whether the value of CTLE control bus 116 has reached a predetermined maximum. If adaptive control logic 110 determines (block 834) that the value of CTLE control bus 116 has reached this maximum, then adaptive control logic 110 sets the extra cycle flag, as indicated by block 836, and method 800 continues as indicated by block 808. If adaptive control logic 110 determines (block 834) that the value of CTLE control bus 116 has not reached this maximum, then adaptive control logic 110 increments the value of CTLE control bus 116, as indicated by block 838. Method 800 then continues as indicated by block 808.

Figure 9:
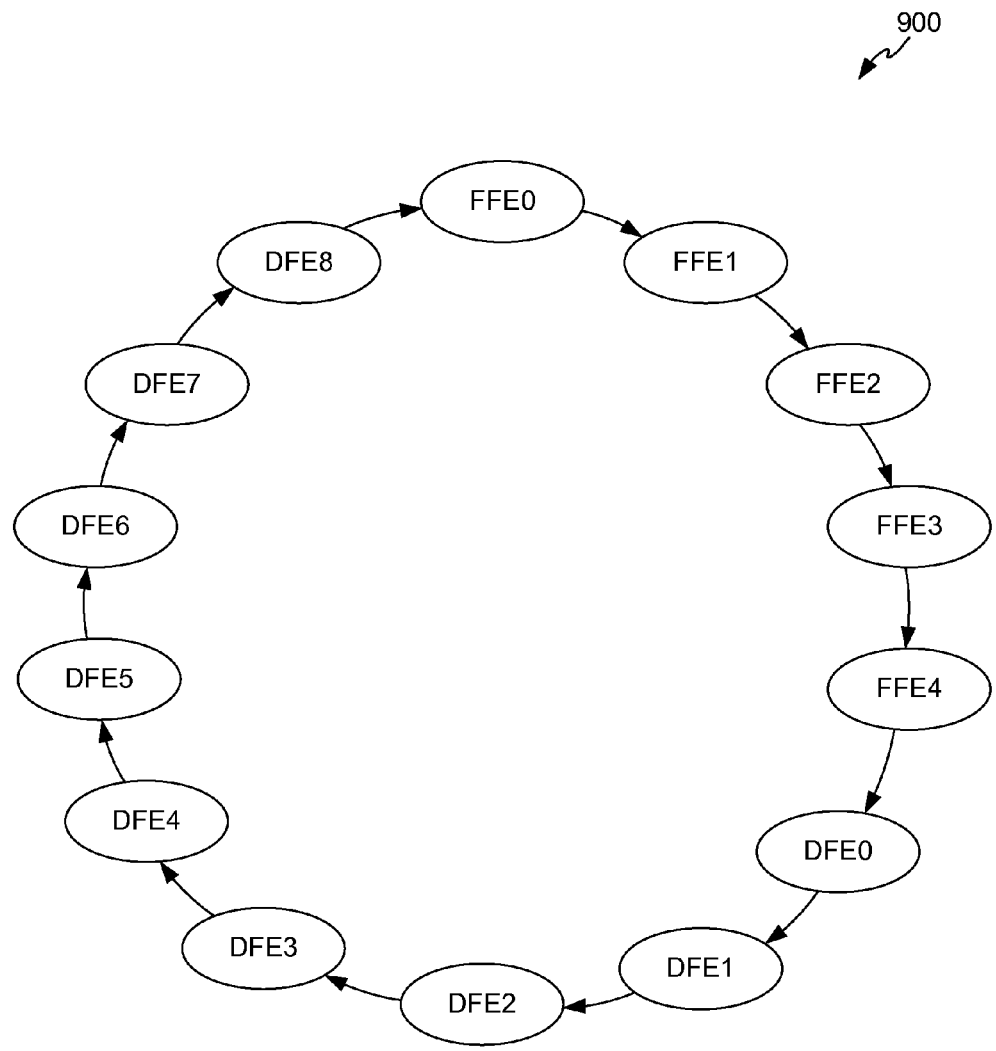
FIG. 9 is a diagram illustrating an exemplary equalizer tap selection sequence.

As illustrated in FIG. 9, the sequence in which the taps are selected in any of the above-described exemplary methods of operation can be selected by a user or selected in response to any suitable criteria or conditions. Equalizer circuitry 102 (FIG. 1) can have, for example, five FFE taps and nine DFE taps. In FIG. 9 the five FFE taps are: FFE0, FFE1, FFE2, FFE3, FFE4. The nine DFE taps are: DFE0, DFE1, DFE2, DFE3, DFE4, DFE5, DFE6, DFE7 and DFE8. An example of a default sequence 900 is shown: FFE0, FFE1, FFE2, FFE3, FFE4, DFE0, DFE1, DFE2, DFE3, DFE4, DFE5, DFE6, DFE7, DFE8. However, user interface circuitry 108 allows a user to select any other suitable sequence. Note that the number of taps that a sequence consists of, such as, for example, the above-referenced 14 taps, can be user selectable. A tap can be included multiple times in the sequence.

Figure 10A:
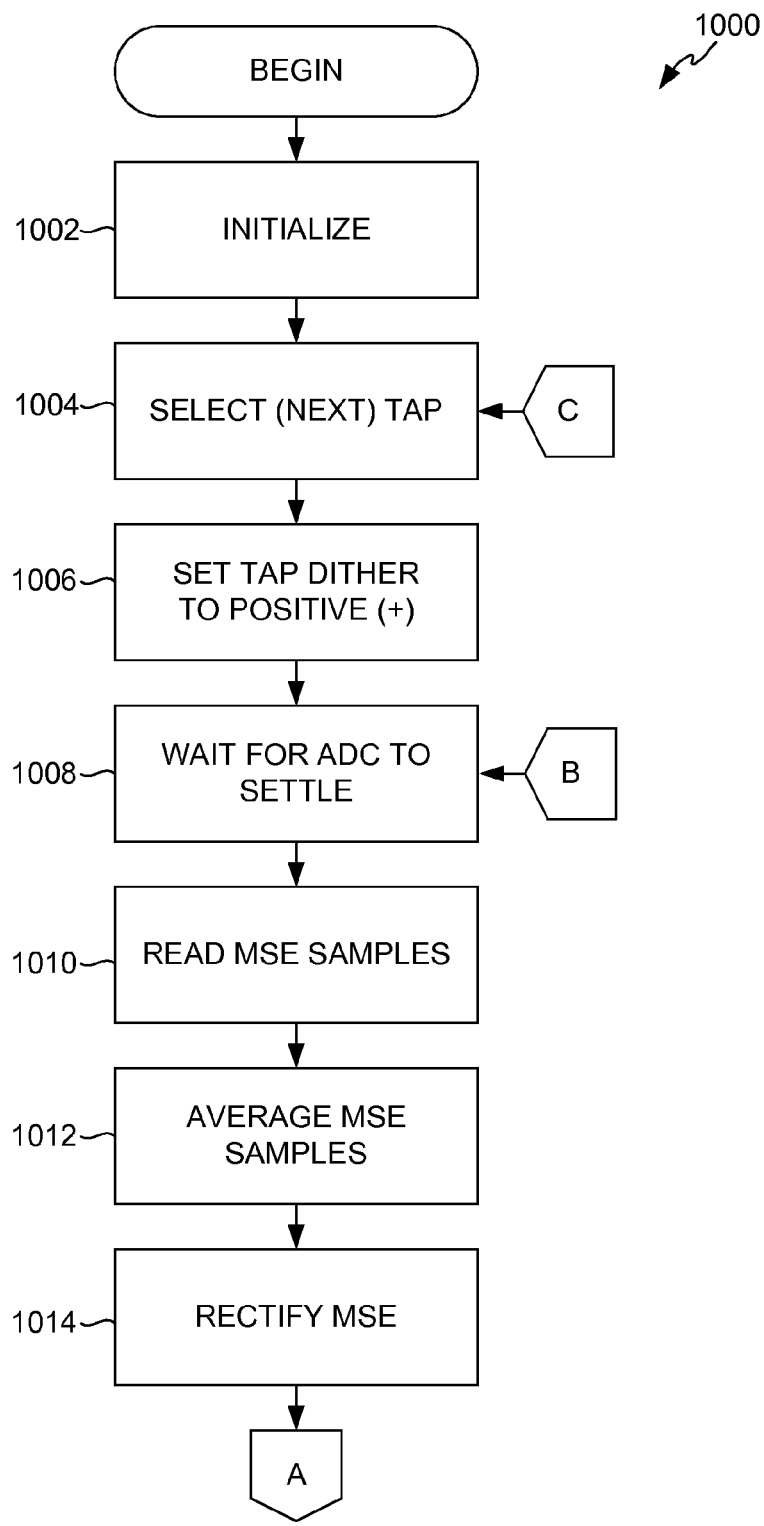
FIG. 10A is a flow diagram of a eighth exemplary method of operation of the adaptive equalizer of FIG. 1.
Figure 10B:
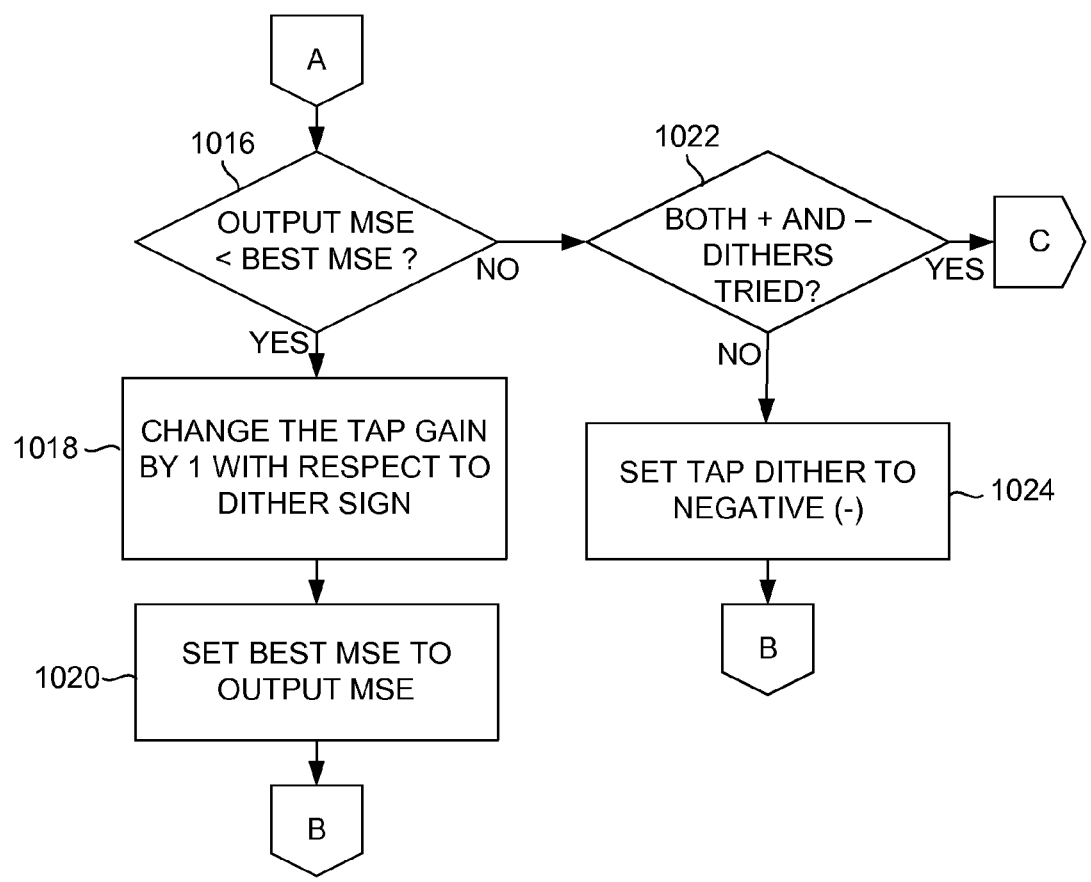
FIG. 10B is a continuation of the flow diagram of FIG. 10A.

As illustrated in FIGS. 10A-B, in another exemplary embodiment adaptive equalizer 100 (FIG. 1) can operate in accordance with an exemplary method of operation 1000. Blocks 1002, 1004, 1006, 1008, 1010, 1012, 1014, 1016, 1020, 1022 and 1024 are the same as blocks 202, 204, 206, 208, 210, 212, 214, 216, 220, 222 and 224 respectively, described above with regard to FIG. 2. Accordingly, for purposes of clarity they are not described again with regard to FIG. 10.

If adaptive control logic 110 determines (block 1016) that the output MSE value is not less than the best MSE value and determines (block 1022) that both positive and negative dithers have been tried, then method 1000 continues as indicated by block 1004. Note that block 1004 indicates selection of the next tap in the sequence for the next cycle. If adaptive control logic 110 determines (block 1016) that the output MSE value is not less than the best MSE value and determines (block 1022) that negative dither has not yet been tried, then adaptive control logic 110 sets the dither control signal 114 controlling the selected tap to negative, as indicated by block 1024, and method 1000 continues as indicated by block 1008. Note that block 1008 does not indicate selection of the next tap in the sequence. Rather, the cycle is repeated with the same tap selected.

However, if adaptive control logic determines (block 1016) that the output MSE value is less than the best MSE value, then adaptive control logic 110 adjusts the tap gain control signal 112 controlling the selected tap. More specifically, if the dither control signal 114 controlling the selected tap has been set to positive dither, then adaptive control logic 110 increments the tap gain control signal 112 controlling the selected tap. If the dither control signal 114 controlling the selected tap has been set to negative dither, then adaptive control logic 110 decrements the tap gain control signal 112 controlling the selected tap.

The goal of method 1000 is to attempt to achieve further convergence by repeatedly applying dither to the same tap and adjusting tap gain accordingly, until no further convergence is detected. Stated another way, adaptive control logic 110 iteratively adjusts the gain control signal 112 for the same selected tap while maintaining the same value for the corresponding dither control signal 114 without selecting the next tap (block 1004) until it is determined that the output MSE value is no longer less than the best MSE value.

The above-described methods 200, 300, 400, 500, 600, 700, 800 and 1000 have been described separately or independently from one another for purposes of clarity. However, it should be understood that these methods can be combined with each other in any suitable combination. Similarly, they can be performed at any suitable time and in any suitable order. In some embodiments, a user can select which of these methods is performed, in combination with what other methods it is performed, how often it is performed, etc.

One or more illustrative embodiments of the invention have been described above. However, it is to be understood that the invention is defined by the appended claims and is not limited to the specific embodiments described.

What is claimed is:

1. An equalizer, comprising:
   equalizer circuitry configured to output an equalized signal in response to an input signal, a plurality of gain control signals, and a plurality of dither control signals, the equalizer circuitry having a plurality of taps, each tap controlled by a set of control signals comprising one of the plurality of gain control signals and one of the plurality of dither control signals;
   a mean squared error (MSE) system configured to provide an output MSE value in response to the equalized signal during each of a plurality of cycles; and
   adaptive control logic configured to adjust the plurality of gain control signals and the plurality of dither control signals in response to an MSE value, the adaptive control logic configured to select the plurality of taps in a predetermined sequence over the plurality of cycles, wherein the adaptive control logic is configured to determine whether the output MSE value is less than a best MSE value following adjustment of the set of control signals controlling a selected tap during one of the plurality of cycles, the adaptive control logic further configured to set the best MSE value to the output MSE value and to adjust a gain control signal controlling the selected tap during a cycle if it is determined that the output MSE value is less than the best MSE value, and wherein if the adaptive control logic determines that the output MSE value is less than the best MSE value following adjustment of the set of control signals controlling a selected tap, then before selecting a next tap of the plurality of taps in the predetermined sequence during a next cycle the adaptive control logic adjusts the dither control signal to a different dither value and determines whether the output MSE value in response to the different dither value is less than the best MSE value, wherein the adaptive control logic is further configured to iteratively adjust a limiting path signal swing in the MSE system and determine whether adjusting the limiting path signal swing results in a decrease in an amplitude difference between a limiting path signal and a linear path signal in the MSE system.

2. The equalizer of claim 1, wherein the adaptive control logic is further configured to determine if the best MSE value is substantially equal to the output MSE value after a predetermined number of sequential cycles, the adaptive control logic setting the best MSE value to the output MSE value if it is determined that the best MSE value is substantially equal to the output MSE value after the predetermined number of sequential cycles.

3. The equalizer of claim 1, wherein if the adaptive control logic determines that the output MSE value is less than the best MSE value following adjustment of the set of control signals controlling a selected tap, then before selecting a next tap of the plurality of taps and before adjusting the dither control signal the adaptive control logic adjusts the gain control signal controlling the selected tap to a different gain value and determines whether the output MSE value in response to the different gain value is less than the best MSE value.

4. The equalizer of claim 1, wherein the adaptive control logic is further configured to iteratively adjust a gain input signal provided to the MSE system and to determine whether adjusting the gain input signal results in an increase in the output MSE value.

5. The equalizer of claim 1, wherein the adaptive control logic is further configured to iteratively adjust a continuous time linear equalizer (CTLE) input signal provided to the equalizer circuitry and to determine whether adjusting the CTLE input signal results in a decrease in the output MSE value.

6. The equalizer of claim 1, wherein the predetermined sequence is user-selectable.

7. The equalizer of claim 1, wherein the adaptive control logic is configured to iteratively adjust the gain control signal controlling the selected tap to a different gain value while maintaining dither control signal controlling the selected tap at the same dither value without selecting the next tap on each of a plurality of iterations, until the adaptive control logic determines that the output MSE value is not less than the best MSE value following adjustment of the set of control signals controlling a selected tap.

8. The equalizer of claim 1, wherein the adaptive control logic directs the equalizer circuitry to provide an equalized signal responsive to a summing node and a slicer.

9. The equalizer of claim 2, wherein the adaptive control logic is further configured to iteratively determine if the best MSE value is substantially equal to the output MSE value after a predetermined number of sequential cycles in each of a plurality of iterations, the adaptive control logic setting circuitry to a low power consumption mode if it is determined that the best MSE value is substantially equal to the output MSE value after a predetermined number of sequential cycles in each of a plurality of iterations.

10. A method of operation in an equalizer comprising equalizer circuitry, a mean squared error (MSE) system, and adaptive control logic, the method comprising:
the equalizer circuitry outputting an equalized signal in response to an input signal, a plurality of gain control signals, and a plurality of dither control signals, the equalizer circuitry having a plurality of taps, each tap controlled by a set of control signals comprising one of the plurality of gain control signals and one of the plurality of dither control signals;
the MSE system providing an output MSE value in response to the equalized signal during each of a plurality of cycles;
the adaptive control logic adjusting the plurality of gain control signals and the plurality of dither control signals in response to an MSE value, the adaptive control logic selecting the plurality of taps in a predetermined sequence over the plurality of cycles including selecting a next tap during a next cycle;
the adaptive control logic determining whether the output MSE value is less than a best MSE value following adjustment of the set of control signals controlling a selected tap during one of the plurality of cycles;
the adaptive control logic setting the best MSE value to the output MSE value and adjusting a gain control signal controlling the selected tap during a cycle if the adaptive control logic determines that the output MSE value is less than the best MSE value; and
before selecting a next tap, if the adaptive control logic determines that the output MSE value is less than the best MSE value following adjustment of the set of control signals controlling a selected tap, then the adaptive control logic adjusting the dither control signal to a different dither value and determines whether the output MSE value in response to the different dither value is less than the best MSE value, the adaptive control logic iteratively adjusting a limiting path signal swing in the MSE system and determining whether adjusting the limiting path signal swing results in a decrease in an amplitude difference between a limiting path signal and a linear path signal in the MSE system.

11. The method of claim 10, further comprising:
the adaptive control logic determining if the best MSE value is substantially equal to the output MSE value after a predetermined number of sequential cycles; and
the adaptive control logic setting the best MSE value to the output MSE value if it is determined that the MSE value is substantially equal to the output MSE value after the predetermined number of sequential cycles.

12. The method of claim 10, further comprising:
if the adaptive control logic determines that the output MSE value is less than the best MSE value following adjustment of the set of control signals controlling a selected tap, then before selecting a next tap of the plurality of taps and before adjusting the dither control signal the adaptive control logic adjusts the gain control signal controlling the selected tap to a different gain value and determines whether the output MSE value in response to the different gain value is less than the best MSE value.

13. The method of claim 10, further comprising the adaptive control logic iteratively adjusting a gain input signal provided to the MSE system and determining whether adjusting the gain input signal results in an increase in the output MSE value.

14. The method of claim 10, further comprising the adaptive control logic iteratively adjusting a continuous time linear equalizer (CTLE) input signal provided to the equalizer circuitry and determining whether adjusting the CTLE input signal results in a decrease in output MSE value.

15. The method of claim 10, further comprising the adaptive control logic receiving user input indicating a user's selection of the predetermined sequence.

16. The method of claim 10, further comprising the adaptive control logic iteratively adjusting the gain control signal controlling the selected tap to a different gain value while maintaining dither control signal controlling the selected tap at the same dither value without selecting the next tap on each of a plurality of iterations, until the adaptive control logic determines that the output MSE value is not less than the best MSE value following adjustment of the set of control signals controlling a selected tap.

17. The method of claim 10, further comprising the adaptive control logic iteratively adjusting a decision feedback equalizer (DFE) input signal provided to the equalizer circuitry and generating an equalized signal responsive to a summing node and a slicer.

18. The method of claim 11, further comprising:
the adaptive control logic iteratively determining if the best MSE value is substantially equal to the output MSE value after a predetermined number of sequential cycles in each of a plurality of iterations; and
the adaptive control logic setting circuitry to a low power consumption mode if it is determined that the best MSE value is substantially equal to the output MSE value after a predetermined number of sequential cycles in each of a plurality of iterations.

19. A computer program product for controlling a system comprising equalizer circuitry, a mean squared error (MSE) system, and adaptive control logic, the adaptive control logic comprising a processor, the computer program product comprising a non-transitory computer-readable medium having stored thereon in computer-executable format instructions that when executed on the processor cause the processor to effect a method comprising:
the equalizer circuitry outputting an equalized signal in response to an input signal, a plurality of gain control signals, and a plurality of dither control signals, the equalizer circuitry having a plurality of taps, each tap controlled by a set of control signals comprising one of the plurality of gain control signals and one of the plurality of dither control signals;
the MSE system providing an output MSE value in response to the equalized signal during each of a plurality of cycles;
the adaptive control logic adjusting the plurality of gain control signals and the plurality of dither control signals in response to an MSE value, the adaptive control logic selecting the plurality of taps in a predetermined sequence over the plurality of cycles including selecting a next tap during a next cycle;
the adaptive control logic determining whether the output MSE value is less than a best MSE value following adjustment of the set of control signals controlling a selected tap during one of the plurality of cycles;
the adaptive control logic setting the best MSE value to the output MSE value and adjusting a gain control signal controlling the selected tap during a cycle if the adaptive control logic determines that the output MSE value is less than the best MSE value; and
before selecting a next tap, if the adaptive control logic determines that the output MSE value is less than the best MSE value following adjustment of the set of control signals controlling a selected tap, then the adaptive control logic adjusting the dither control signal to a different dither value and determines whether the output MSE value in response to the different dither value is less than the best MSE value, the adaptive control logic iteratively adjusting a limiting path signal swing in the MSE system and determining whether adjusting the limiting path signal swing results in a decrease in an amplitude difference between a limiting path signal and a linear path signal in the MSE system.

20. The computer program product of claim 19, wherein the method effected by execution of the instructions further comprises:
the adaptive control logic determining if the best MSE value is substantially equal to the output MSE value after a predetermined number of sequential cycles; and
the adaptive control logic setting the best MSE value to the output MSE value if it is determined that the MSE value is substantially equal to the output MSE value after the predetermined number of sequential cycles.

\* \* \* \* \*